United States Patent
Thubert et al.

(10) Patent No.: US 10,880,344 B2
(45) Date of Patent: Dec. 29, 2020

(54) MULTIPARTY REAL-TIME COMMUNICATIONS SUPPORT OVER INFORMATION-CENTRIC NETWORKING

(71) Applicant: Cisco Technology, Inc., San Jose, CA (US)

(72) Inventors: Pascal Thubert, La Colle sur Loup (FR); Xiaoqing Zhu, Austin, TX (US); Giovanna Carofiglio, Issy les Moulineaux (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/539,297

(22) Filed: Aug. 13, 2019

(65) Prior Publication Data
US 2019/0364078 A1    Nov. 28, 2019

Related U.S. Application Data

(62) Division of application No. 14/987,409, filed on Jan. 4, 2016, now Pat. No. 10,432,678.

(51) Int. Cl.
*G06F 15/16* (2006.01)
*H04L 29/06* (2006.01)

(52) U.S. Cl.
CPC ........ *H04L 65/403* (2013.01); *H04L 65/1069* (2013.01)

(58) Field of Classification Search
CPC ... H04L 65/403; H04L 65/1069; H04L 61/00; H04L 61/1073
See application file for complete search history.

(56) References Cited

U.S. PATENT DOCUMENTS

| | | |
|---|---|---|
| 2009/0288163 A1 | 11/2009 | Jacobson et al. |
| 2011/0083073 A1 | 4/2011 | Atkins et al. |
| 2011/0228922 A1 | 9/2011 | Dhara et al. |
| 2013/0016695 A1 | 1/2013 | Ravindran et al. |
| 2013/0039249 A1 | 2/2013 | Ravindran et al. |

(Continued)

OTHER PUBLICATIONS

Zhu, et al., "ACT: Audio Conference Tool Over Named Data Networking," ICN, Aug. 19, 2011, 6 pages; http://irl.cs.ucla.edu/~zhenkai/papers/icn10c-zhu.pdf.

(Continued)

*Primary Examiner* — Yves Dalencourt

(57) ABSTRACT

Embodiments include technologies for creating a manifest for a conferencing event in a network, adding a name tag identifying the conferencing event to the manifest, receiving an interest packet including one or more parameters indicating a named flow being produced at a source node, adding content metadata of the named flow to the manifest, and sending the manifest to the source node. Further embodiments include adding, to the manifest, session-level metadata associated with a user of the source node. Embodiments include receiving a second interest packet with one or more second parameters identifying a user of a client node, where the second interest packet indicates a request to authorize the user of the client node to subscribe to the conferencing event. In further embodiments, session-level metadata associated with the user is added to the manifest if the user is authorized to subscribe to the conferencing event.

20 Claims, 16 Drawing Sheets

(56) References Cited

U.S. PATENT DOCUMENTS

| | | | |
|---|---|---|---|
| 2014/0053228 A1 | 2/2014 | Mahadevan et al. | |
| 2015/0039754 A1* | 2/2015 | Gupta | H04L 41/147 709/224 |
| 2015/0139166 A1 | 5/2015 | Yao et al. | |
| 2015/0264096 A1 | 9/2015 | Swaminathan et al. | |
| 2015/0281071 A1 | 10/2015 | Mosko et al. | |
| 2016/0134915 A1* | 5/2016 | Oran | H04L 65/4084 725/95 |

OTHER PUBLICATIONS

"CCN Case Studies," Computer Science Laboratory Networking & Distributed Systems, Palo Alto Research Center, Inc., Mar. 2014, 97 pages; http://www.ccnx.org/pubs/hhg/6.1%20CCN%20Case%20Studies.pdf.

"Content Centric Networking," Wikipedia, Oct. 7, 2015, 4 pages; http://en.wikipedia.org/wiki/Content centric networking.

Xu, et al., "Live Streaming with Content Centric Networking," Networking and Distributed Computing (ICNDC), IEEE, Oct. 2014, 5 pages; http://www.mit.edu/~caoj/pub/doc/jcao c live.pdf.

Zhang, et al., "Named Data Networking," ACM SIGCOMM Computer Communications Review, vol. 44, No. 3, Jul. 2014, 8 pages; http://named-data.net/wp-content/uploads/2014/04/tr-ndn-0019-ndn.pdf.

"Named Data Networking: Motivation & Details", printed from Internet Jul. 27, 2015, 9 pages; http://named-data. net/project/archoverview/.

"Named Data Networking," Wikipedia, Sep. 4, 2015, 10 pages; https://en.wikipedia.org/wiki/Named_data_networking.

Kulinski, et al., "NDNVideo: Random-access Live and Pre-recorded Streaming using NDN," Technical Report NDN, Sep. 2012, 17 pages; http://www.named-data.net/techreport/TR007-streaming.pdf.

Handley, et al., "SDP: Session Description Protocol," Network Working Group, RFC 4566, Jul. 2006, 47 pages; http://www.rfc-editor.org/info/rfc4566.

K. Hartke, "Observing Resources in CoAP", draft-ietf-core-observe-16, CoRE Working Group, Internet—Draft, Intended status: Standards Track, Dec. 30, 2014, 34 pages.

Nick Galea, "The Session Description Protocol (SDP)—VoIP Part 1", https://www.3cx.com/blog/voip-howto/sdp-voip/, Oct. 11, 2009, 4 pages.

School of Information Science and Technology, University of Science and Technology of China, "Video Conference Over NDN", https://web.archive.org/web/20140224224908/http:/www.hoticn.org/docs/tanxiaobin.pdf, Feb. 24, 2014, 18 pages.

\* cited by examiner

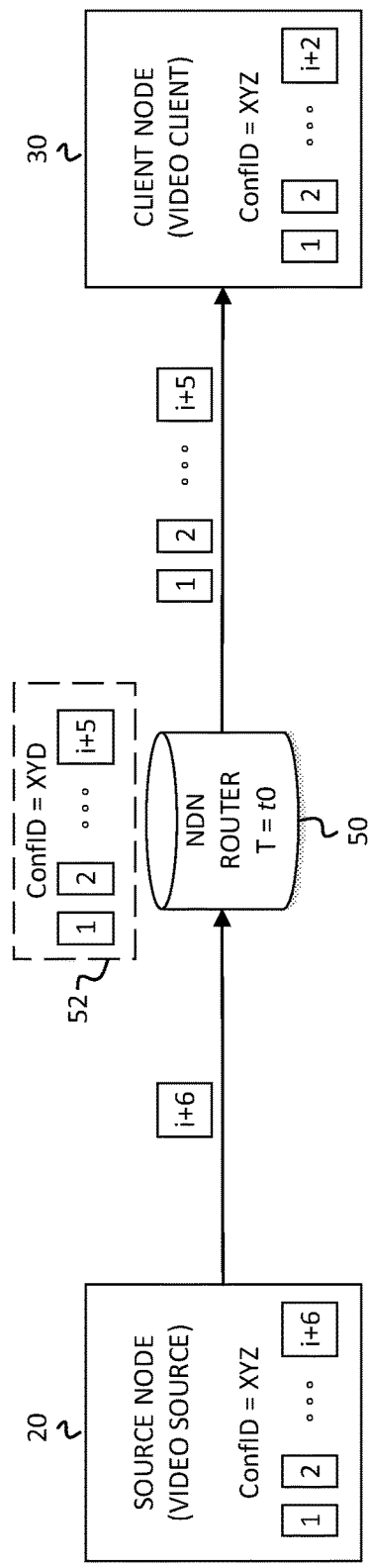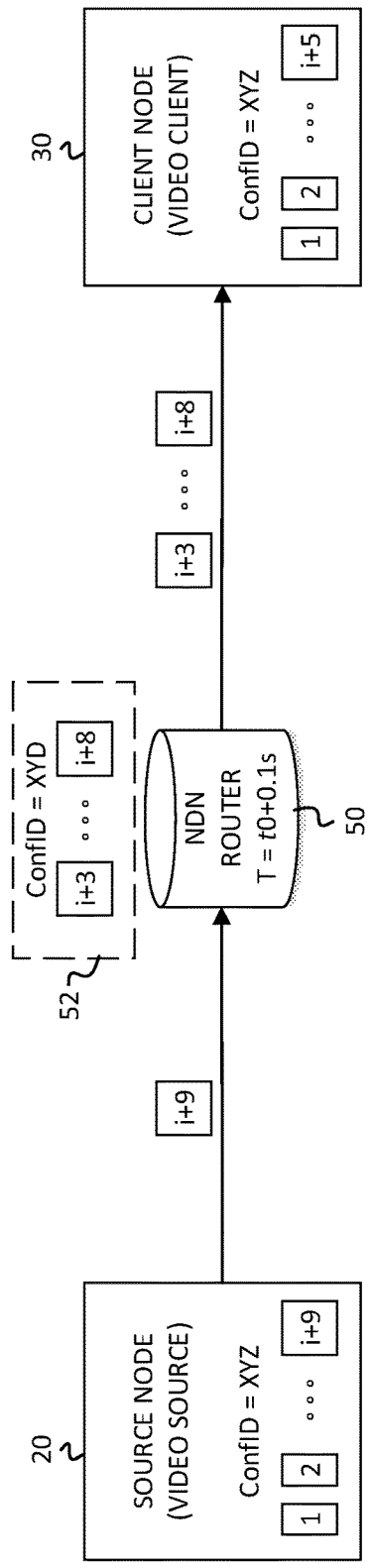

MULTIPARTY REAL-TIME COMMUNICATIONS SUPPORT OVER INFORMATION-CENTRIC NETWORKING

CROSS-REFERENCE TO RELATED APPLICATION

This application is a divisional of and claims benefit to U.S. patent application Ser. No. 14/987,409, filed Jan. 4, 2016, the entire contents of which are incorporated herein by reference.

TECHNICAL FIELD

This disclosure relates in general to the field of networking, and more particularly, to multiparty real-time communications support over Information-Centric Networking.

BACKGROUND

Information-Centric Networking (ICN) represents a broad research direction for moving the Internet toward a content/information/data centric network architecture. At least some future network architecture possibilities for ICN are based on empirical research related to network usage and the desire to overcome problems with existing architectures such as Internet Protocol. ICN and its specific architecture designs, such as Named Data Networking (NDN), offer a fundamentally different approach in supporting information dissemination over global networks. NDN is related to Content-Centric Networking (CCN), which is content-based (or data-oriented) networking rather than host-oriented networking. In CCN, the flow of messages through a network is based on the content of the messages rather than numerically addressed hosts. The premise of NDN is that the flow of messages is based on named data rather than numerically addressed hosts. Providing an NDN network that offers effective multiparty real-time communications, such as live video conferencing, presents a significant challenge to network designers, service providers, and administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A and 4B are simplified interaction diagrams illustrating possible scenarios of data flows and caching for multiparty real-time communications in the communication system according to at least one embodiment;

DETAILED DESCRIPTION OF EMBODIMENTS

Overview

Figure 1:
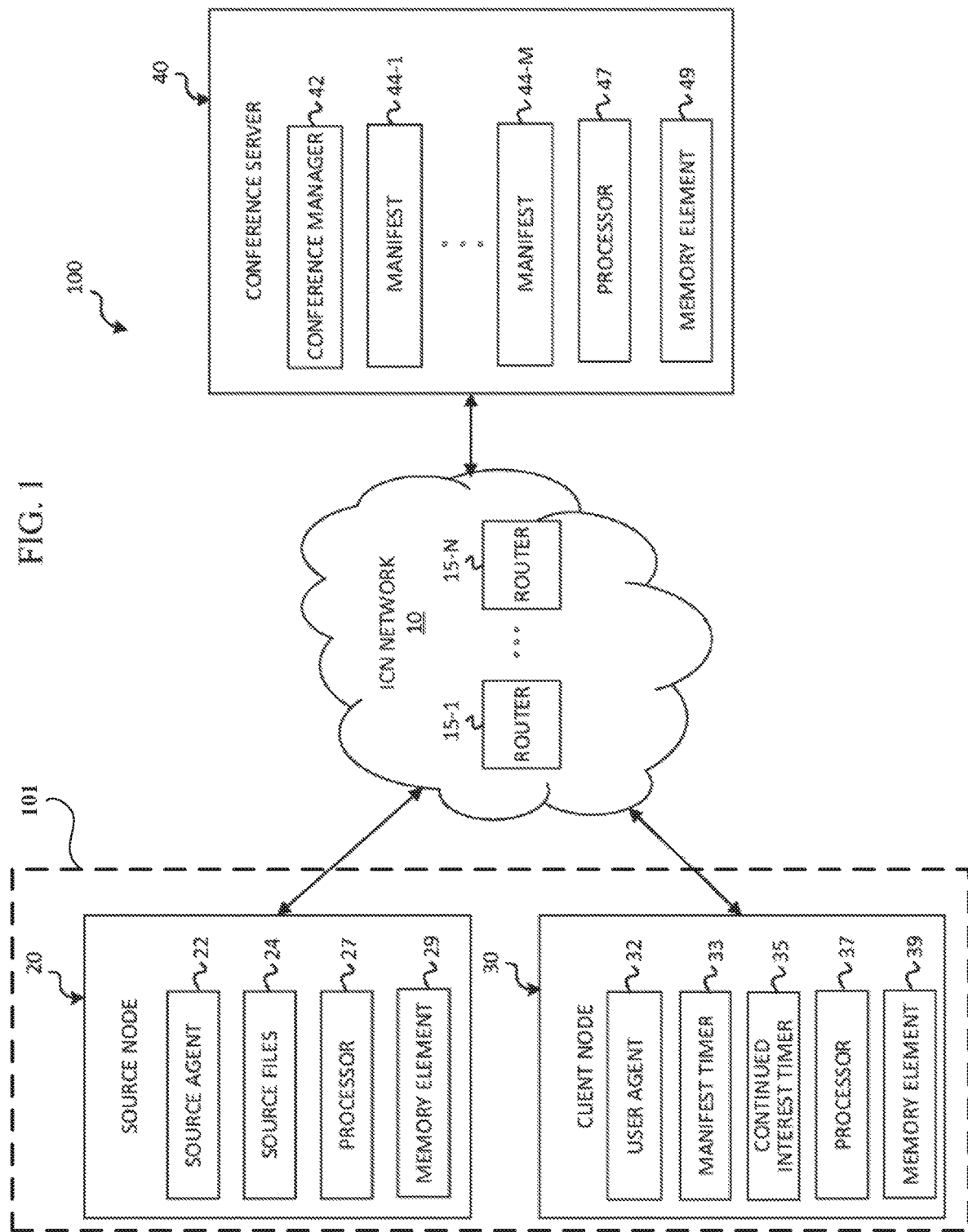
FIG. 1 is a simplified block diagram of a communication system for multiparty real-time communications according to at least one embodiment of the present disclosure.

The present disclosure describes methods of providing multiparty real-time communications in an Information-Centric networking architecture. In one example in the present disclosure, a method is provided and includes creating a manifest for a conferencing event in a network, adding a name tag identifying the conferencing event to the manifest, receiving an interest packet including one or more parameters indicating a named flow being produced at a source node, adding content metadata of the named flow to the manifest, and sending the manifest to the source node.

In more specific embodiments, the method may also include adding, to the manifest, session-level metadata associated with a user of the source node. Content metadata may not be added to the manifest unless a user of the source node is authorized to produce the named flow for the conferencing event. The content metadata may include at least a type, an activity status, or one or more caching properties associated with the named flow. In more specific embodiments, the method can include receiving a second interest packet including one or more second parameters identifying a user of a client node, where the second interest packet indicates a request to authorize the user of the client node to subscribe to the conferencing event. Session-level metadata associated with the user of the client node may be added to the manifest if the user of the client node is authorized to subscribe to the conferencing event.

In further specific embodiments, the client node and the source node are integrated as a single mobile device. In more specific embodiments, the network includes a Named Data Networking architecture. The manifest may include the name tag of the conferencing event, a first identifier associated with the source node, a second identifier associated a client node, and a name label of the named flow. The method can include advertising the name tag in the network.

The present disclosure describes other methods associated with providing multiparty real-time communications, which include receiving a continued interest packet indicating a first time period for which a client node requests recurring deliveries of a named flow being produced at a source node. The method also includes sending to the client node a plurality of segments of the named flow, where the segments are sent successively at given time intervals during the first time period. The method further includes sending, to the source node, a plurality of interest packets during the first time period to request consecutive portions of the named flow.

In more specific embodiments, a name label of the named flow is published in a manifest associated with a conferencing event in a network. The continued interest packet may include the name label associated with the named flow and a name tag associated with the conferencing event. In more specific embodiments, each segment of the plurality of segments is longer than one of the time intervals by a factor of N, wherein N is greater than one. For each pair of first and second segments sent successively to the client node, a portion of the first segment may be included in the second segment. Segments of the named flow may be pulled successively from a cache at the given time intervals. In further embodiments, the continued interest packet is received in a network element of a network, and the network includes a Named Data Networking (NDN) architecture.

In more specific embodiments, the method includes, responsive to receiving a consecutive portion of the named flow from the source node, deleting from the cache an oldest portion of the named flow stored in the cache, where the oldest portion corresponds in duration to the received consecutive portion, and storing the received consecutive portion in the cache. In further embodiments, each consecutive portion of the named flow is a frame of the named flow, and each segment of the named flow includes a set of frames of the named flow. In yet further embodiments, the named flow includes one of video content, voice content, or slides content.

Some or all of the elements, operations, and features may be included in respective systems, apparatuses, and devices for performing the described functionality. Furthermore, some or all of the features may be implemented in at least one machine readable storage medium.

Description

FIG. 1 is a simplified block diagram of a communication system 100 for multiparty real-time communications in a network environment. FIG. 1 includes a source node 20, a client node 30, and a conference server 40, which communicate over an Information-Centric Networking (ICN) network 10. The ICN network can include multiple routers 15-1 through 15-N, and/or any other network elements capable of routing packets in accordance with ICN protocols. In one example implementation, the ICN network may be implemented using a Named Data Networking (NDN) architecture and routers 15-1 through 15-N may route packets based on NDN protocols. In at least one example, source node 20 can include a source agent 22, source files 24, a processor 27, and a memory element 29. Client node 30 can include a user agent 32, a manifest 33, a continued interest timer 35, a processor 37, and a memory element 39. Conference server 40 can include a conference manager 42, a processor 47, and a memory element 49. In at least one embodiment, when conferencing events are active, conference server 40 may also include one or more manifests 44-1 through 44-M.

For purposes of illustrating certain example techniques of communication system 100, it is important to understand the communications that may be traversing the network and the protocols used in effecting such communications. The following foundational information may be viewed as a basis from which the present disclosure may be properly explained.

Information-Centric Networking (ICN) offers a fundamentally different approach for information dissemination in a network environment. This approach involves a content/information/data centric network architecture. Named Data Networking (NDN) is a particular example of an ICN architecture that provides a new network design. Rather than identifying packets traversing a network based on source and destination addresses, NDN packets are identified based on their content. When responding to requests, routers do not look up information based on where the source and destination are, but instead look up a content request based on an identifier of the content. The NDN architecture may be described as a publish/subscribe model where the source of the information can publish certain content being indexed by a universal address. The universal address, however, is an identification of the content. The destination can try to get the content by subscribing. Tracking information disseminated over the Internet can potentially be more efficient if it is tracked based on content rather than source and destination addresses.

Communication in an NDN network is typically driven by receivers or clients, through the exchange of interest packets and data packets. A namespace in NDN allows data (or content) to be referred to by name. For a data item to be globally accessible, the data item is assigned a globally unique name. In an NDN network, names may be hierarchically structured. When a client wants particular data, the client can generate an interest packet that includes the name of the desired data. The name of the desired data may be provided by the user that intends to consume the desired data. Interest packets may also include other information such as selectors (e.g., order preference, publisher filter, exclude filter, etc.), a nonce, and guiders (e.g., scope, interest lifetime).

NDN routers use the name to forward the interest packet toward the desired data. The desired data may be found in the source that produced the desired data or in other nodes along a path to the source. A node between the source and the client may have stored the desired data after noticing the desired data passing through the node one or more times.

When an interest packet reaches a node that contains the desired data (e.g., either the source node or another node along a path to the source node), the node can generate a data packet that includes the name and the data. In addition, the data packet may also include a signature by a key from the data producer. To reach the requesting client, the data packet can follow the reverse path taken by the interest packet. A data packet can include a name, meta information (e.g., content type, freshness period, etc.), content (i.e., the requested data), and signature (e.g., signature type, key locator, signature bits, etc.).

While NDN is designed to provide naturally more secure and efficient large-scale content delivery, a few attempts have been made to show how it can support real-time, interactive applications, such as gaming and live video conferencing over an NDN network fabric. A mechanism is lacking, however, for enabling dynamic multicast of live content (e.g., multiparty conferencing) using NDN fabric over mobile networks and in a multi-homing context. In addition, a conferencing use case differs significantly from a streaming case. As used herein, a 'conference' is intended to include any multiparty, real-time interactive communications. In particular, a conference can incorporate at least some of the following: multiple sources, multiple clients, multiple media modes (e.g., audio and video), mobile participants, multiple network and end device capabilities, multiple different interests, the need to re-sync with new comers (e.g., caching iframe), the need to support either push or pull interaction models, and strict latency and short-lived caches implied by live stream.

Embodiments of a communication system as described herein can resolve the aforementioned issues (and more) associated with multiparty real-time communications in an NDN fabric and, more generally, in an ICN fabric. For ease of explanation, at least some embodiments are further described herein with reference to an NDN implementation. The broad concepts disclosed herein, however, are not limited to NDN implementations and can be applied to other ICN architectures. In general, communication system 100 looks at the derivative of data and interests flows, and uses the NDN fabric to access flows as opposed to blocks of data. As used herein, the term 'flow' is intended to mean a form of network communications such as a sequence of packets containing content (e.g., of a live stream), which can be sent from one node (e.g., a source node) in a network to one or more other nodes (e.g., a client node). Embodiments focus on real-time interactive applications and can assign one name label per live flow. A short-lived caching window can be maintained for all data associated with a given flow with the same name label. This enables contents to be constantly refreshed. In at least one embodiment, all data packets belonging to the same live stream are labeled as the same content, and are periodically refreshed at the in-network NDN routers/caches, while supporting multi-format targeting of the same content to different devices. Significantly, embodiments described herein account for participants' mobility.

More specifically, communication system 100 can associate a conferencing event itself with a name tag. The assigned conference name can then be exposed in an NDN fabric and advertised so as to be globally routable for requests coming from mobile (or other) clients. The initiation of the conferencing event can be performed by a single user via a client or source node and can hold for a given amount of time, after which the conferencing event expires if no one joins. The given amount of time can be parameterized by a timer. Participants of the conference can join the conference by subscribing and publishing to the conference name tag. The action of subscribing enables the user to receive encoded audiovisual streams from upstream NDN network nodes. The action of publishing causes the user to tag its own audiovisual bitstream with the same conference name tag. This enables multiple sources to contribute to the content generation in an asynchronous manner. It also allows participating users to receive all packets associated with a video conferencing session. NDN distributed caching ensures the presence of content even when users are mobile and the routing topology changes over time.

Several advantages are provided by embodiments of communication system 100, which enable multiparty real-time conferencing in an ICN architecture such as NDN. First, an embodiment of a communication system as described herein extends the support of NDN fabrics to real-time and interactive applications. Second, embodiments extend existing optimizations of cache positioning in NDN to network elements (e.g., routers) in charge of duplicating and forwarding flows. Additionally, embodiments can decouple the design of naming mechanisms for contents of a live video stream from the naming mechanisms for a live video flow. For contents of a live video stream, the naming mechanism can include individual packets and fragments of an encoded audiovisual stream still following existing protocols such as Real-time Transport Protocol (RTP). For a live video flow, the naming mechanism can involve the use of name labels, which will be further described herein.

Turning to FIG. 1, a description of the infrastructure of communication system 100 is now provided. Generally, communication system 100 can be provisioned in one or more networks, such as ICN network 10, which represent a series of points or nodes of interconnected communication paths for receiving and transmitting packets of information (or other communications) that propagate through the one or more networks. These nodes offer communicative interfaces between source nodes, destination (or client) nodes, and intermediate nodes. A network, such as ICN network 10, can comprise any number of hardware and/or software elements coupled to (and in communication with) each other through a communication medium. Such networks can include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof, including wired and/or wireless communication.

These networks through which communications propagate in communication system 100, can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

In FIG. 1, ICN network 10 represents the one or more networks in which communication system 100 may be provisioned. In at least some embodiments, the ICN network can be configured with an NDN architecture, which is a particular type of ICN architecture. In other embodiments, communication system 100 would be equally applicable to other ICN architectures, such as Content Centric Networking (CCN), for example. ICN network 10 may include network elements, such as routers 15-1 through 15-N, to facilitate network communications between source nodes, client nodes, and conference servers of communication system 100. In an NDN architecture, the routers may be configured to accommodate an NDN protocol. An example of an NDN router in accordance with embodiments disclosed herein will be further described with reference to FIG. 2.

Communication system 100 may include a configuration capable of using a communication protocol, such as a name-prefix based routing protocol in NDN networks, for the transmission and/or reception of network communications in a network. Network communications (also referred to herein as 'communications'), can be inclusive of packets, frames, signals, data, content, objects, etc., and can be sent and received in communication system 100 according to any suitable communication messaging protocols such as the name-prefix based routing protocol. Communication system 100 may also operate in conjunction with any other suitable protocol, where appropriate and based on particular needs. The term 'data' and 'content' as used herein, refer to any type of binary, numeric, voice, video, textual, photographic, or script data, or any type of source or object code, or any other suitable information in any appropriate format that may be communicated from one point to another in computing systems (e.g., servers, nodes, routers, computing devices, client nodes, source nodes, etc.) and/or networks. Additionally, flows, named flows, interest messages (also referred to herein as 'interests'), continued interest messages, other messages, responses, replies, queries, etc. are forms of network communications.

Figure 3:
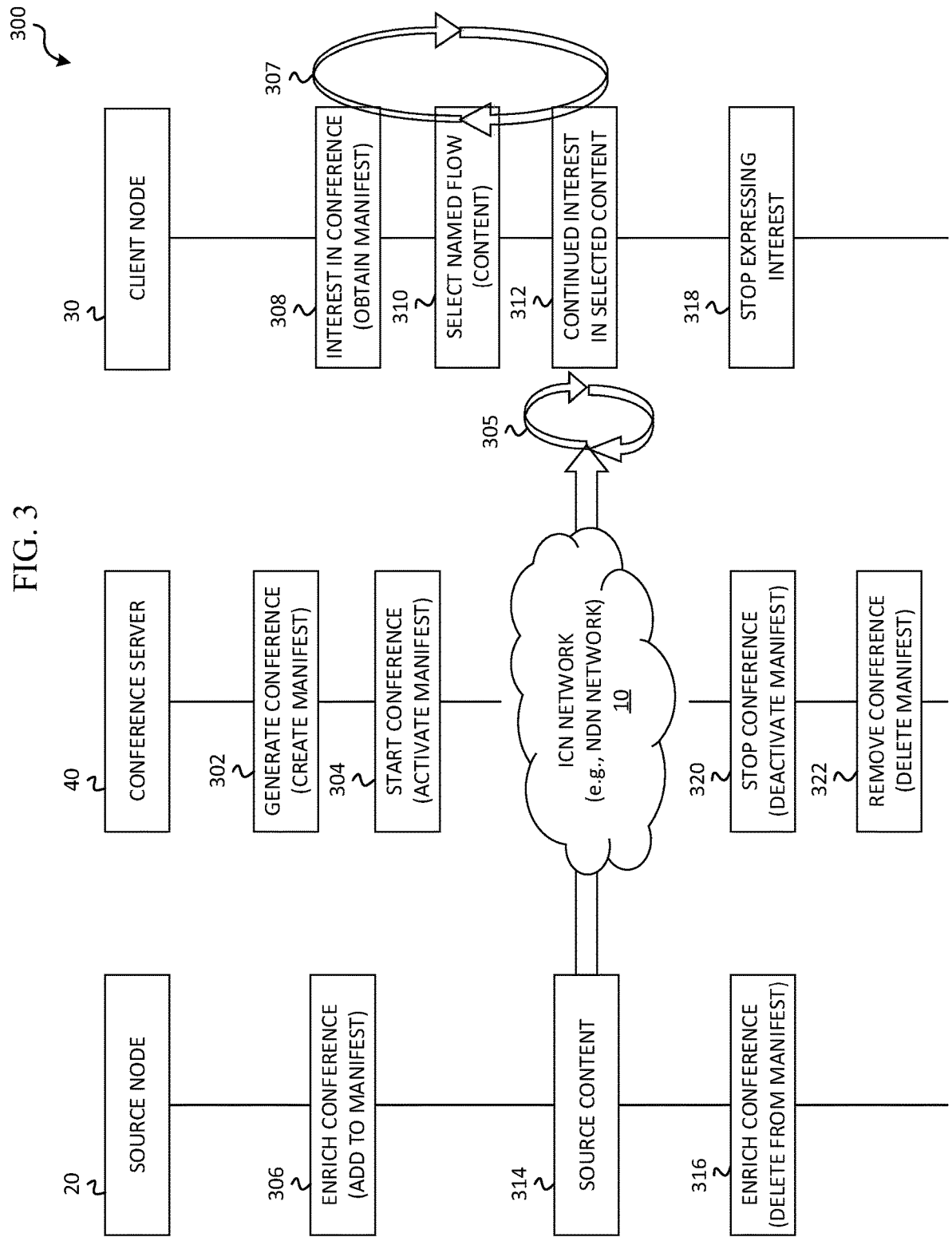
FIG. 3 is a simplified interaction diagram for multiparty real-time communications in the communication system according to at least one embodiment.

Routers 15-1 through 15-N shown in ICN network 10 are network elements that facilitate network communications between source nodes, client nodes, conference servers, and other network elements in a given network (e.g., for networks such as those illustrated in FIGS. 1 and 3). As used herein, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

Conference server 40 is a network element that can be associated with creating and managing a conferencing event in communication system 100. Generally, conference server 40 can act as a hub between source nodes and client nodes that join a conferencing event by publishing named flows to the conferencing event and/or by subscribing to the conferencing event. In at least one embodiment, conference manager 42 may include logic for managing conferencing events.

A conferencing event can be expressed as a live or activated manifest. In at least one embodiment, each conferencing event managed by conference server 40 can be expressed by its own dedicated manifest as indicated at 44-1 through 44-M. A manifest may be similar to a torrent file, and can be fetched periodically (e.g., seconds) or with continued interest. The manifest may include, but is not limited to, a name tag associated with the conferencing event, identification of source nodes and client nodes, session-level metadata (e.g., identification of users in the conference), identification of contents (e.g., name labels of named flows being produced for the conferencing event), and content metadata (e.g., type, activity, caching properties, etc.). An activity of content metadata can be a status of the producer such as, active or inactive. In some examples, more specific activity information could include, for example, speaking, listening, away from computer, etc. An example of a caching property could include, but is not limited to, where caching occurs, duration of cached content, etc.

Source and client nodes 20 and 30, respectively, can be associated with users wishing to initiate a communication in communication system 10 via some network. A user of a conferencing event may participate as a consumer, as a producer, or as both a consumer and a producer. A 'producer' is a content source and may produce various types of content including, but not limited to, live data such as voice, slides, and/or video. Each content item (e.g., a stream) can be obtained by a 'consumer' via an NDN architecture as many interests. Embodiments herein can also allow a consumer to obtain content via a 'continued interest', which can be expressed for a period of time. For simplicity, source node 20 and client node 30 are illustrated and explained herein as being associated with a producer and a consumer, respectively. It will be apparent, however, that any node can be configured to accommodate a user acting as both a producer and a consumer and thus a node can operate as both a source node and client node.

The term 'node' is inclusive of devices used to initiate a communication in a network, such as desktop computers, laptop computers, mobile devices, smart phones, tablets, electronic notebooks, vehicle infotainment systems, gaming systems, smart TVs, or any other device, component, element, or object capable of initiating voice, audio, video, media, or data exchanges within communication system 10. A node may be inclusive of a suitable interface to a human user, such as a display, a keyboard, a touchpad, a remote control, or other terminal equipment. Additionally, a node may be any device that seeks to initiate a communication on behalf of another entity or element, such as a program, a database, or any other component, device, element, or object capable of initiating an exchange within communication system 10. Source and client nodes 20 and 30 are examples of a node.

Various components are shown in source and client nodes 20 and 30 of FIG. 1 to indicate the respective operational features of the nodes. As previously noted herein, however, each node may be configured for use as both a source and client node in the same conferencing events and, therefore, the components may be combined in any suitable arrangement or configuration to achieve the operational features of both a source node and a client node. For example, referring to FIG. 1, a node 101 can include both the source node 20 and the client node 30.

In particular, source node 20 may include source agent 22 to enable a user to join a conferencing event as a producer to publish a named flow in a manifest of the conferencing event. Thus, a user of source node 20 can produce content to inject into the conferencing event if the user/source node is authorized. Source files 24 may be configured as any suitable storage component such as a temporary cache for the content produced at source node 20 for the conferencing event.

Client node 30 may include user agent 32 to enable a user to subscribe to a conferencing event as a consumer and to receive content injected into the conferencing event by one or more producers via one or more source nodes. Manifest timer 33 may be configured to enable appropriately timed iterative interest requests for a copy of the manifest of the conferencing event to which the consumer has subscribed. In other embodiments, manifest timer 33 may be configured to enable appropriately timed iterative continued interest requests for the manifest. Similarly, continued interest timer 35 may be configured to enable appropriately timed iterative continued interest requests for content being produced in the conferencing event. A named flow can be selected from the copy of the manifest at client node 20, either manually by the user or automatically based on user settings or default settings.

In one implementation, routers 15-1 through 15-2, source node 20, client node 30, and conference server 40 each include software to achieve (or to foster) the multiparty real-time conferencing, as outlined herein. Note that in one example, each of these elements can have an internal structure (e.g., a processor, a memory element, etc.) to facilitate some of the operations described herein. In other embodiments, these multiparty real-time conferencing operations may be executed externally to these elements, or included in some other network element to achieve this intended functionality. Alternatively, these elements may include this software (or reciprocating software) that can coordinate with other network elements in order to achieve the operations, as outlined herein. In further embodiments, these elements may include any suitable algorithms, hardware, software, firmware, components, modules, interfaces, or objects that facilitate the operations thereof.

Figure 2:
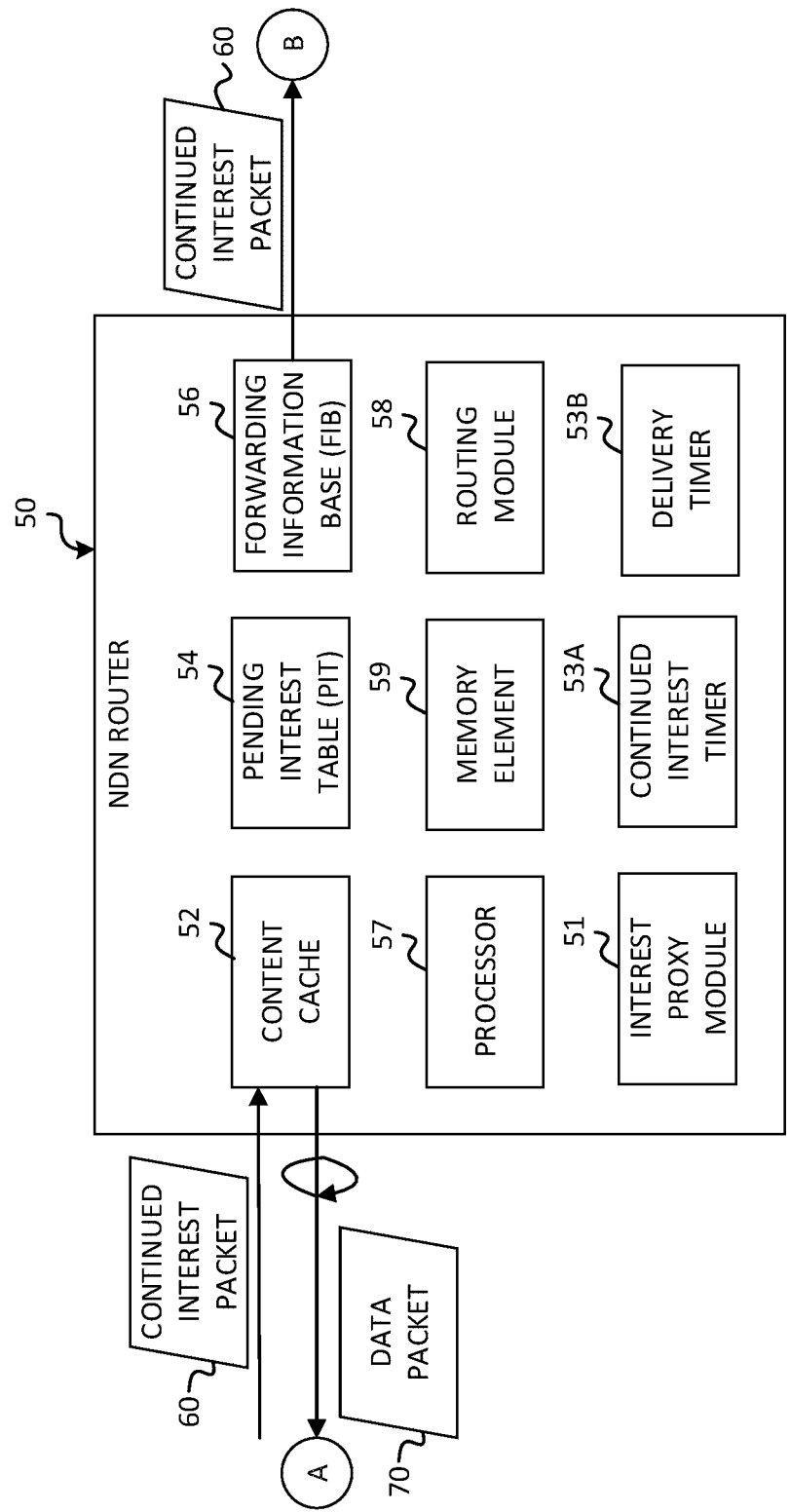
FIG. 2 is a simplified block diagram of an example router that can be used in the communication system according to at least one embodiment.

Turning to FIG. 2, a simplified block diagram of an example NDN router 50 that enables packet forwarding in communication system 100 is illustrated. NDN router 50 is a network element that can facilitate network communications between source nodes, client nodes and conference servers in an NDN network. In one example, NDN router 50 can include content cache 52, pending interest table (PIT) 54, forwarding information base (FIB) 56, routing module 58, interest proxy module 51, continued interest timer 53A, and delivery timer 53B. NDN router 50 may also include appropriate hardware including, but not limited to, processor 57 and memory element 59.

Routing module 58 may be configured to determine whether, when and where to forward interest and data packets from source node 20, client node 30, and conference server 40. In a typical NDN operation, PIT 54 may store interest packets (including continued interest packets as further described herein) that the router has forwarded but not yet satisfied. Content cache 52 can be a temporary cache of data packets received by the router, which can be used to satisfy future interest packets or current active continued interest packets. Thus, when NDN router 50 receives an interest packet, the NDN router can first check content cache 52 for data requested in the interest packet. If the data is found in the content cache, then the NDN router can return the data in a data packet on the interface from which the interest packet was received. Otherwise, NDN router 50 can look up the name in the interest packet in PIT 54. If a matching entry for the name exists in the PIT, then the NDN router can record the incoming interface in the PIT entry. Otherwise, the NDN router can forward the interest packet based on information in FIB 56 and the logic of routing module 58.

In at least one embodiment, NDN router 50 is configured with the capability of satisfying a continued interest packet 60. A continued interest packet is a packet sent by a client node to indicate continued interest in a named flow selected from the manifest of a conferencing event. The continued interest packet may specify a period of time during which the client node wants to continue receiving content without having to send additional interest packets. The named flow can be selected from the manifest at the client node by a user of the client node, or can be selected automatically based on preselected user preferences or based on default settings.

In at least one embodiment, interest proxy module 51 enables NDN router 50 to process continued interest packets when received. With reference to FIG. 2, if continued interest packet 60 is received, but the NDN router has not been caching the named flow, NDN router 50 can forward the continued interest packet 60 at B, toward a source node that produced the named flow requested by the packet. However, if content cache 52 contains content corresponding to the named flow requested in continued interest packet 60, then NDN router 50 can satisfy the interest request over a period of time that is indicated in continued interest packet 60.

In at least one embodiment, continued interest timer 53A may be started when a continued interest packet 60 is received by NDN router 50 and it is determined that content cache 52 contains content that is requested in continued interest packet 60. Continued interest timer 53A may be set for a period of time indicated in continued interest packet 60. Delivery timer 53B may also be started. Delivery timer 53B may be set to maintain an interval between recurring deliveries of content to the client node, where the interval amount is selected to provide resiliency and minimize missing data.

In at least one embodiment, the continued interest packet specifies recurring delivery criteria. Recurring delivery criteria can include one or both of the size of the segment of content to be sent to the client node and the frequency at which segments are to be sent to the client node. In one example, the size of the segment is expressed in time and may be 200 ms, while the frequency of deliver may be 100 ms. Thus, in this example, 200 ms of content is sent to client node 30 every 100 ms. Consequently, in a given segment received by client node 30, typically 100 ms of the content is a duplicate of 100 ms of content received in a prior segment.

NDN router 50 can continue to satisfy the interest request until continued interest timer 53A expires. It will be apparent that continued interest timer 53A and delivery timer 53B represent possible examples for controlling how long NDN router 50 continues to satisfy the continued interest request and how often segments of content are sent to client node 30. It will be apparent, however, that any other suitable logic and/or mechanisms may be used to ensure that NDN router 50 satisfies the continued interest request for the period of time indicated in continued interest packet 60, and that NDN router 50 delivers segments of content.

Turning to FIG. 3, a simplified interaction diagram of a multiparty real-time conferencing event in communication system 100 over ICN network 10 is provided. In at least one embodiment, ICN network 10 may be implemented as an NDN network. Interaction diagram 300 includes source node 20, client node 30, and conference server 40, all of which communicate via the NDN network. Interaction diagram 300 illustrates activities performed by each of the entities (source node 20, client node 30, and conference server 40) during the conferencing event to which users of the source and client nodes are publishing and subscribing, respectively. For ease of explanation, a user of the source node in interaction diagram 300 acts only as a producer (via source node 20), and a user of the client node in interaction diagram 300 acts only as a consumer (via client node 30). It will be apparent, however, that the source node could be configured with client node functionality and vice versa. Thus, users of either or both of the nodes could act as both a producer and a consumer during the conferencing event. Furthermore, it should be noted that in a conferencing event, many source nodes and/or many client nodes may be accommodated by conference server 40 and thus, allowed to subscribe and/or publish to the conferencing event. Furthermore, conference server 40 may also accommodate multiple conferencing events to which other nodes publish and/or subscribe.

Several concepts can be implemented to support a multiparty real-time conferencing event of communication system 100 in an NDN fabric in accordance with the present disclosure, and these concepts are now described with reference to FIG. 3. An 'abstract' metaContent is provided in which a conferencing event is represented by manifest metadata, real contents are selected and streamed by a consumer, and content is described for streaming properties. An 'enrich' content method is provided rather than (or in addition to) a plain interest method. The enrich content method adds advertisement to the manifest and is linked to discovery in the NDN network. A 'continued' interest in content is also provided and the interest is not considered served until the continued interest times out. A continued interest may also be expressed for the manifest in at least some embodiments. In addition, short-lived content caching can be provided in NDN routers.

At 302, a conference owner can initiate a conference (also referred to herein as 'conferencing event') at conference server 40. In one example, the conference owner can send a request (e.g., via a regular interest packet) to the conference server to initiate the conference. Conference server 40 can generate the conferencing event by assigning a name to the conference and creating a manifest. The name of the conference can be added to the manifest. At 304, conference server 40 can start the conference by activating the manifest. Activating the manifest includes making the manifest available to be read by consumers and updated by producers. Entries in the manifest can identify contents (e.g., name labels of named flows) and include content metadata including type, activity, caching properties, etc.

Each participant can join as a producer, a consumer, or both producer and consumer. Session-level metadata (e.g., who is in the conference) can be maintained by the manifest, and periodically pulled by existing participants. This introduces low overhead on the NDN network. New participants can join by requesting and updating the existing manifest. A namespace design can include labeling flow of a live stream per conference (i.e., conference ID), per source/user, and/or per device. Individual data segments generated out of a live stream may not be explicitly labeled.

A stream source that has joined the conference as a producer to generate a live stream can create and name flows. A flow of a live stream can be named using a name label. In some instances, more than one flow may be produced from a live stream (e.g., flows offering different resolution of the stream such as 720p, 1080p, 4K, etc.). For example, flows involving live streaming can be created and named in a live gaming broadcast or an ad-hoc conference. The stream source gets the right to inject named flows into the conference. Policies can be supplied that express authorization rules, etc. A source node 20 is an example of a stream source and, at 306, the source node enriches the conference by adding or publishing named flows to the manifest created by conference server 40.

The manifest can be obtained as a separate (meta) content by NDN conference participants associated to the conference NDN name. An end node, such as client node 30, can express an interest for the manifest. At 308, client node 30 expresses an interest in the conference generated by conference server 40 in order to obtain a copy of the current manifest associated with the conference. At 310, client node 30 can select named flows from the manifest received in response to the interest expressed in 308. In one example, each named flow contains a different type of content. For example, client node 30 may select one named flow for voice content and another named flow for video (visual only) content, which may be produced at the same source node. Alternatively, the client node may only select one of the named flows (video or voice), even though they are being produced by the same source node. At 312, client node 30 can express a continued interest on each of the named flows. For example, if a voice flow and a video flow were selected, a first continued interest could be expressed for the voice flow and a second continued interest could be expressed for the video flow. Obtaining the manifest and expressing interest in named flows can be performed using the NDN network. This process results in client node 30 receiving a copy of the selected named flows in successive segments. A user agent on client node 30 can arrange the segments for visual and auditory consumption.

As indicated by a processing loop 307, client node 30 can regularly obtain the conference manifest, or updates to the conference manifest, by expressing interest, or expressing continued interest, during the conference periodically at 308. Any time a manifest is received, it is possible for the user agent of the client node to alter selections of the flows. In particular, when new flows are published or previously published flows are deleted, the client node may make appropriate new selections at 310. As indicated by processing loop 305, client node 30 can obtain content by expressing continued interest in the selected named flow at 312.

A continued interest packet is generally an expression of interest in a particular named item for a given time period. Continued interest packets can be used to request a selected named flow and, in at least some embodiments, continued interest packets may also be used to request the conference manifest. A continued interest packet can stay active in the NDN routers for the given time period as opposed to staying active only until the content is initially served. The duration of the continued interest can be bounded. Recurring deliveries of a named flow (or manifest) can be made by the NDN router to the client node during the given time period while the continued interest packet is active.

At 314, source node 20 sends content in response to receiving interest packets for the named flow. Streaming content, such as a video, may be broken into chunks, such as frames of a flow, and sent in response to an interest request for the named flow. The NDN network forms a tree that is rooted at source node 20. One or more NDN routers in the tree may begin caching content that the routers receive from source node 20. The decision by an NDN router to cache particular content may be based on one or more criteria including, but not limited to, receiving a threshold amount of interest packets at the router for the particular content, the particular content being deemed as a higher priority or more significant, the particular content was requested the most recently, etc.

At 318, a client node 30 may stop expressing interest in named flows produced by source node 20 and may stop expressing interest in the manifest. To leave the conference, client node 30 can send an interest packet with parameters to conference server 40, where the parameters indicate the client node 30 wants to terminate the subscription to the conference. An NDN router that caches content from source node 20 and satisfies continued interest requests from client node 30 can stop caching the content if the NDN router receives no other continued interest packets from other client nodes for the same content. Other NDN routers, however, may continue to cache the content if these other NDN routers continue to receive continued interest packets from other client nodes.

At 316, source node 20 stops producing content for the conference. Source node 20 enriches the conference by sending an interest packet to conference server 40 to delete, from the manifest, the publication or advertisement of source node 20 as a producer and the one or more named flows published in the manifest that are produced by source node 20. If client node 20 is still expressing interest for any of the one or more named flows from source node 20, the next time client node 20 receives the manifest, the manifest can indicate that the one or more named flows from source node 20 are no longer available. Thus, client node 20 would be unable to select the named flows at 310.

In at least one embodiment, if client node 30 receives a manifest that indicates source node 20 is no longer producing the content, then client node 30 may send a message (e.g., 'stop_recurring_interest' message) to deactivate its most recent continued interest packet. This message may be sent to the NDN router that has been satisfying the continued interest packets from client node 20 for the one or more named flows of source node 20. This may be desirable for example, if a continued interest packet was received at the NDN router, which caused the continued interest period to start recently and soon thereafter, the source node quit producing the content for the conference.

If participants of the conference quit producing and consuming contents, then the manifest can be updated to remove all producers and consumers. Conference server 40 can stop the conference at 320, by deactivating the manifest. In this scenario, the manifest is no longer available to producers or consumers. Conference server 40 may then remove the conference by deleting the manifest from conference server 40.

The real-time nature of live conferencing may be advantageously used in one or more embodiments. NDN routers may cache only a small time window of fresh encoded audio/video/slide data (e.g., over the past 120 milliseconds). Archival/time-shifted streaming of recorded conferences can be handled separately from the real-time version. In one example, one of the client nodes that subscribes to the conference could archive the conference. Any suitable approach for handling streaming of recorded conferences may be used.

During a conferencing event, client nodes can configure continued interest packets to request periodically the 'current data in the conference' (e.g., re-request once every 100 ms). The frequency of data request updates needs to strike the right tradeoff between guarding against gaps in received data and overhead/waste in receiving the same data twice. An NDN router can automate periodically repeated requests from client nodes in order to keep the processing hidden from the consumer.

When a participant joins late, a conference manager/control module of conference server 40 can induce the source node to generate a new iframe for the new participant. In one embodiment, this can be the last iframe that was referenced. New iframes are constrained to be generated several hundred milliseconds apart. Therefore, latecomers in a burst can start at the same iframe.

FIGS. 4A and 4B are simplified block diagrams illustrating an example scenario of caching content with a short expiration time in accordance with at least one embodiment. In particular, an example of a recurring delivery of refreshed content with the same interest label (e.g., name label) is now described. In FIGS. 4A-4B, source node 20 and client node 30 publish and subscribe to a conference, respectively. NDN router 50 caches content from source node 20 and satisfies continued interest packets from client node 30 for a named flow. In this example scenario, NDN router 50 may contain content cache 52, which holds a cache window of 200 milliseconds at a given time, which is approximately equal to 6 frames of content. The content is produced for a conference having a name tag of XYZ. An interest packet to subscribe to the conference can include the conference identifier (ConfID) as a parameter: ConfID=XYZ.

A continued interest packet to request a named flow from source node 20 can also include the conference identifier, the name label of a selected named flow, and other parameters. These parameters could include a time period indicating how long the continued interest is to remain active, and an interval of time that indicates how often recurring delivery of the content is to be performed. For example, the interval of time parameter may indicate that recurring delivery is to be performed once per T1, where T1=100 ms, which is approximately three frames. Time-boxed caching may be used to flush out frames older than T2=200 ms, which is approximately 6 frames. Based on these example parameters, content delivery may occur as follows:

In FIG. 4A, Time T=t0: client node 30 receives frames [i, . . . i+5]

In FIG. 4B, Time T=t0+100 ms: client node 30 receives frames [i+3, . . . i+8]

The client node can locally discard repetitive copies of overlapping frames. The choice between T1 and T2 may be balanced between the interests of resiliency versus efficiency.

It should be noted that the recurring delivery mode is intended to represent embodiments in which continued interest is expressed by sending continued interest packets for recurring delivery of content of a named flow (and/or recurring delivery of a manifest) over a period of time. In at least one example, this time period could be approximately several minutes. In the example above, a continued interest packet for the named flow requests the last 200 ms of content to be sent to client node 30 every 100 ms. If a regular or base mode is implemented in which continued interest is not expressed, then client node 30 would repeat interest packets every 100 ms and each interest packet would request the last 200 ms of content.

It should also be noted that in one potential embodiment, object integrity can be maintained by a name label assigned to a flow. The name label of a flow can be essentially, an alias of the stream name. The name label can allow a client node to express continued interest by requesting a relative time or a relative time index along with the name label of the flow. For example, the flow could be requested based on a continued interest using . . . _stream@LATEST, where ' . . . _stream' is the name label of the flow. This could be mapped by the NDN router into the latest segment cached for the aliased stream and the name could be returned in the form stream@DATE. After the initial request, subsequent requests could be made by increasing the last date as in . . . _stream@(DATE+N*T), where N represents the number of cache periods (e.g., 2) and T represents Time (t0, t1, etc.) as described above.

Figure 5:
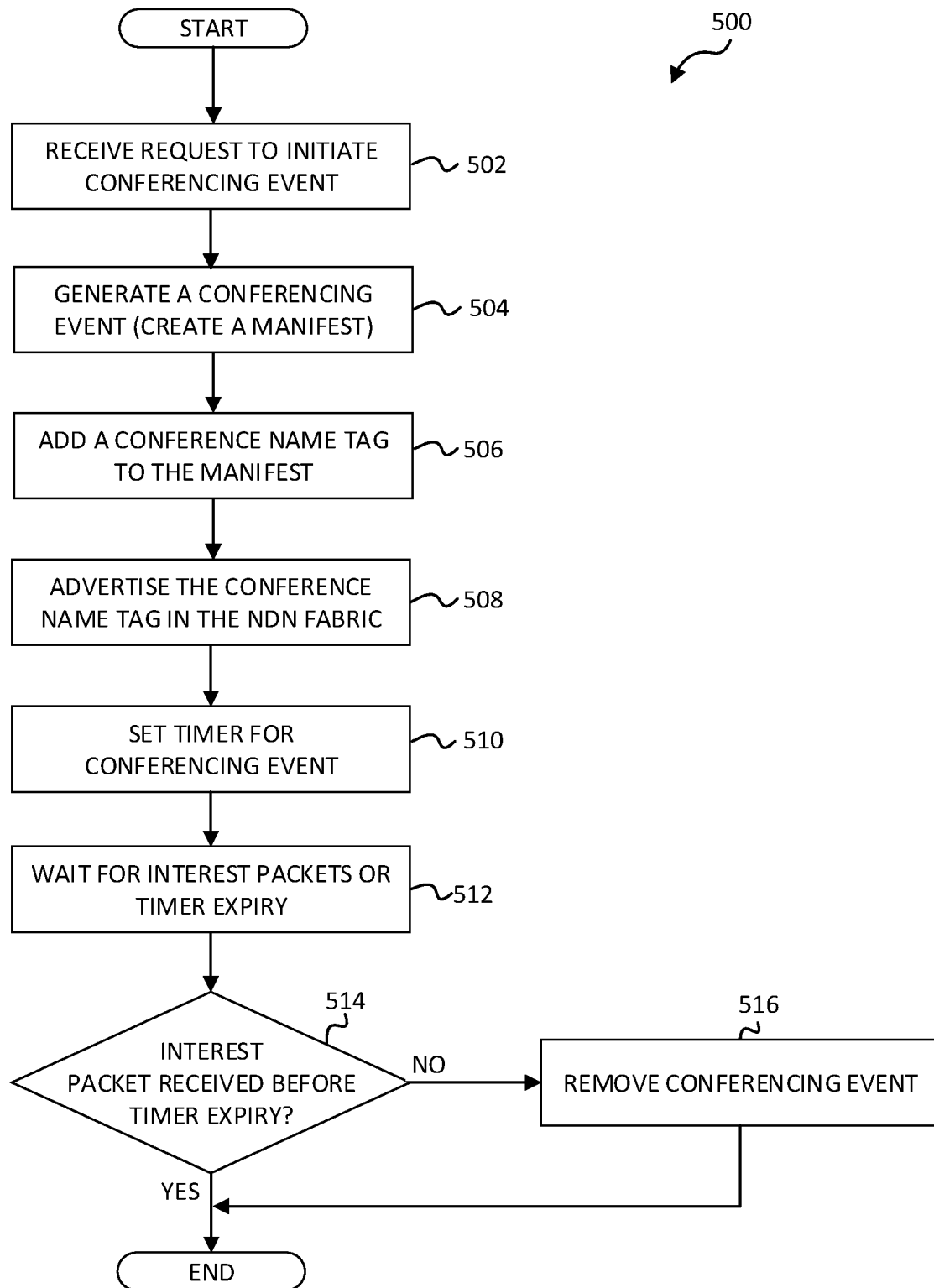
FIG. 5 is a simplified flowchart illustrating example operations associated with multiparty real-time communications in the communication system according to at least one embodiment.

Turning to FIGS. 5 through 13, simplified flowcharts illustrate possible operations that may be performed in accordance with a multiparty real-time conferencing event in at least one embodiment of communication system 100. FIG. 5 shows a flowchart 500 of example operations that may be associated with embodiments described herein. One or more sets of operations may correspond to activities of FIG. 5. In at least one embodiment, conference server 40 may comprise means such as one or more processors (e.g., processor 47), for performing the operations. In one example, at least some of the operations may be performed by conference manager 42 when executed by one or more processors such as processor 47 and may involve a manifest (e.g., manifests 44-1 through 44-M).

At 502, a request to initiate a conferencing event is received. The request may come from a conference owner, who may join the conferencing event as a producer, a consumer, or both. At 504, conference server 40 generates a conferencing event. This may be accomplished by creating a manifest for the conferencing event. At 506, a conference name tag can be associated with the conferencing event by adding the conference name tag to the manifest. At 508, the conference name tag can be advertised in the NDN fabric so as to be globally routable for requests coming from mobile (and other) users.

At 510, a timer may be set for the conferencing event. At 512, conference server 40 waits for whichever comes first: interest packets for the conferencing event or timer expiry. At 514, a determination is made as to whether any interest packets for the conferencing event were received before the timer expiry. If interest packets were not received before the timer expiry, then the conferencing event is removed at 516. This may be accomplished, at least in part, by deleting the manifest. If interest packets are received before timer expiry, however, then the flow ends as the conferencing event is allowed to continue.

Figure 6A:
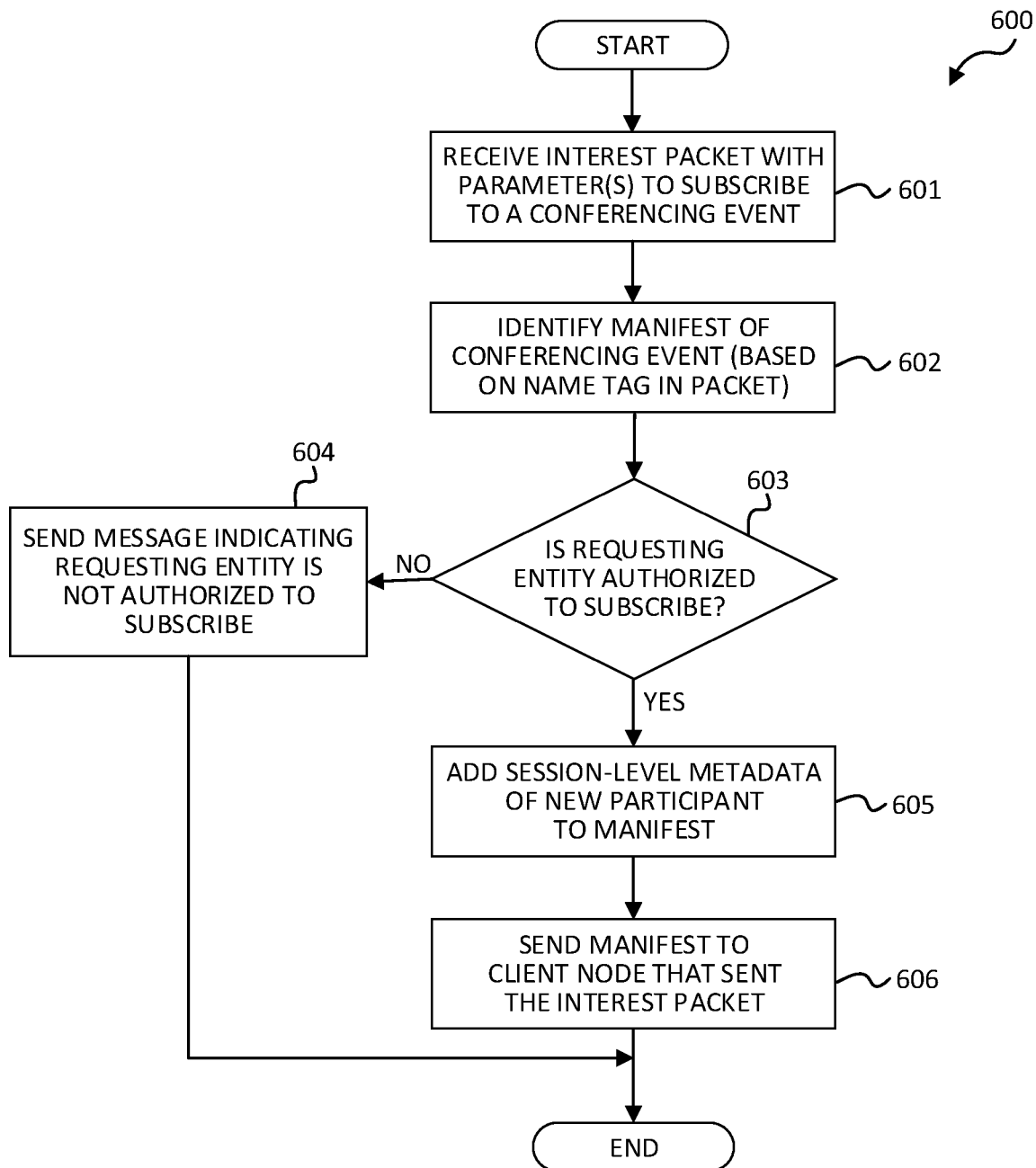
FIGS. 6A, 6B and 6C are simplified flowcharts illustrating other example operations associated with multiparty real-time communications in the communication system according to at least one embodiment.
Figure 6B:
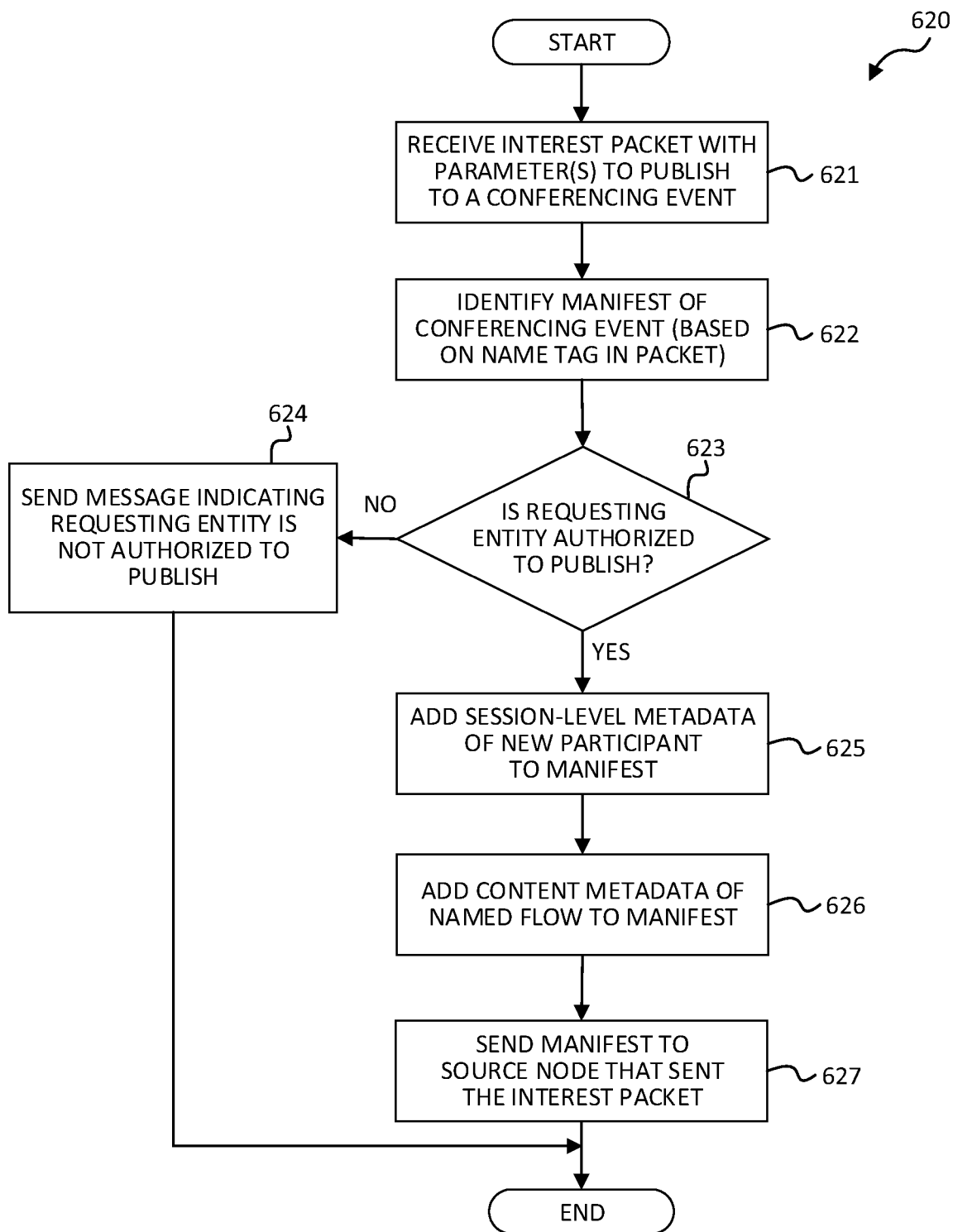
Figure 6C:
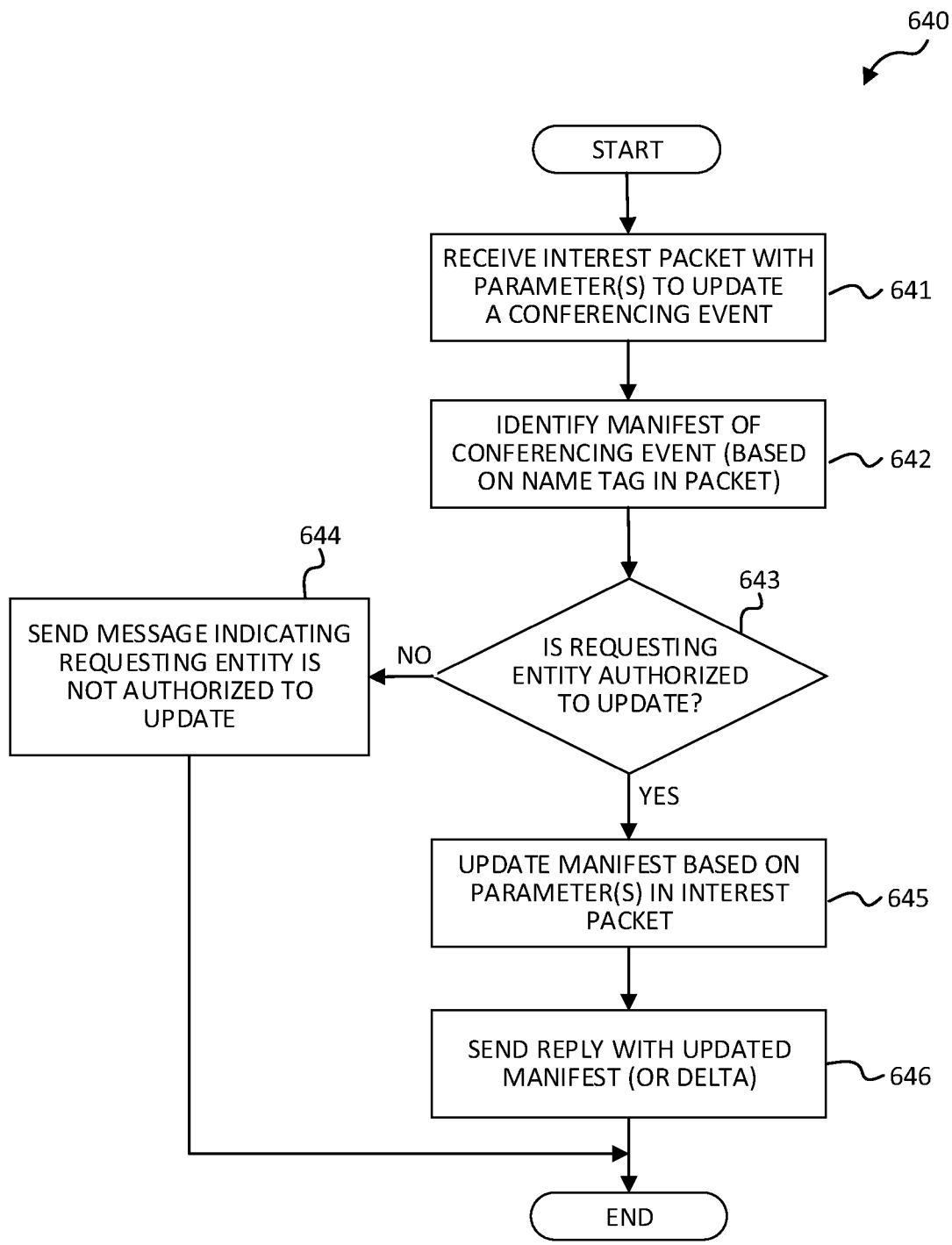

FIGS. 6A, 6B and 6C show flowcharts 600, 620 and 640, respectively, of possible operations that may be associated with embodiments described herein. One or more sets of operations may correspond to activities of FIGS. 6A-6C. In at least one embodiment, conference server 40 may comprise means such as one or more processors (e.g., processor 47), for performing the operations. In one example, at least some operations shown in flows 600, 620 and 640 may be performed by conference manager 42 when executed by one or more processors such as processor 47 and may involve a manifest (e.g., manifests 44-1 through 44-M). Generally, flowcharts 600, 620, and 640 illustrate examples of possible operations that may be performed by a conference server when interest packets with parameters are received by the conference server.

Flowchart 600 of FIG. 6A illustrates possible operations that may be performed by a conference server when a client node attempts to subscribe to an active conferencing event. Operations of flowchart 600 may begin after a manifest has been created and the name of the conferencing event has been advertised in the network to make it globally routable. This enables the conference server to receive interest packets for the manifest. Typically, an interest packet in an NDN network is a pull command. In at least one embodiment, however, at least some interest packets that are received by conference server 40 can include one or more parameters that may cause the conference server 40 to write to, delete from, modify and/or otherwise update a manifest.

At 601, an interest packet with parameters is received at the conference server for an active conferencing event. The parameters of the interest packet received at 601 can include session-level metadata related to a client node and/or user of the client node seeking to subscribe to the conferencing event. These parameters can indicate a request to authorize the client node and/or user of the client node to subscribe to the conferencing event. In addition, the interest packet can include the name tag of the conferencing event that corresponds to the manifest. At 602, the manifest for the conferencing event may be identified based on the name tag in the interest packet.

At 603, a determination is made as to whether a requesting entity associated with the interest packet is authorized to subscribe to the conferencing event. A 'requesting entity' is intended to include a node and/or a user of the node seeking to participate in a conferencing event by consuming content from and/or producing content for the conferencing event. Any suitable authorization techniques (e.g., username/passwords, unique conferencing identifier, device identifier, etc.) may be used to validate the requesting entity. Authorization techniques may be based on the particular node and/or user (or user agent) associated with the interest packet. If the requesting entity is not authorized to subscribe to the conferencing event, then a message may be sent at 604, indicating that the requesting entity is not authorized to subscribe to the conferencing event. In at least one embodiment, this message may be displayed on a display screen of the client node.

If the requesting entity is authorized to subscribe to the conferencing event, as determined at 603, then at 605, the session-level metadata of the new participant (i.e., the node and/or the user) is added to the manifest. In particular, the participant is indicated in the manifest as a consumer. A consumer receives content (e.g., voice, video, slides, etc.) produced during the conferencing event. At 606, the updated manifest is sent to the client node that sent the interest packet. If the manifest has not been previously received by the client node, then the complete manifest may be provided.

Flowchart 620 of FIG. 6B illustrates possible operations that may be performed by a conference server when a source node attempts to publish to an active conferencing event. Operations of flowchart 620 may begin after a manifest has been created and the name of the conferencing event has been advertised in the network to make it globally routable. At 621, an interest packet with parameters is received for an active conferencing event. The parameters of the interest packet can include session-level metadata related to a source node and/or user of the source node seeking to inject content into the conferencing event, in addition to content metadata of a named flow to be injected into the conferencing event. These parameters can indicate a request to authorize the source node and/or user of the source node to inject content into the conferencing event by publishing the named flow or flows in the manifest. At 622, the manifest for the conferencing event may be identified based on the name tag in the interest packet.

At 623, a determination is made as to whether a requesting entity associated with the interest packet is authorized to publish to the conferencing event. In this flowchart, a requesting entity includes a node and/or a user of the node seeking to participate in a conferencing event by producing content for the conferencing event. As described with reference to FIG. 6A, any suitable authorization techniques may be used to validate the requesting entity. If the requesting entity is not authorized to publish to the conferencing event, then a message may be sent at 624, indicating that the requesting entity is not authorized to publish to the conferencing event. In at least one embodiment, this message may be displayed on a display screen of the client node.

If the requesting entity is authorized to publish to the conferencing event, as determined at 623, then at 625, the session-level metadata of the new participant (i.e., the node and/or the user) is added to the manifest. In particular, the participant is indicated in the manifest as a producer. A producer publishes a named flow to the manifest and produces the content of the named flow to be injected into the conferencing event. In at least some embodiments, separate interest packets may be sent from a node to a conference server to join a conferencing event as both a producer and as a consumer. In other embodiments, a node may use a single interest packet with parameters to subscribe and publish to the conferencing event.

At 626, content metadata of the named flow is added to manifest and associated to the new participant (i.e., the source node and/or user of the source node). The content metadata could include, but is not limited to, the name label of the named flow, type, activity, and caching properties. Thus, when the manifest is received by client nodes that subscribe to the conferencing event, the manifest can provide sufficient information for the named flow to be accessed by the client nodes. At 627, the updated manifest is sent to the source node that sent the interest packet. If the manifest has not been previously received by the source node, then the complete manifest may be provided.

Flowchart 640 of FIG. 6C illustrates possible operations that may be performed by a conference server when a source node or client node attempts to update an active conferencing event. Operations of flowchart 640 may begin after a manifest has been created and the name of the conferencing event has been advertised in the network to make it globally routable. At 641, an interest packet with parameters is received for an active conferencing event. The parameters of the interest packet can include information related to an update being requested for the conferencing event. At 642, the manifest for the conferencing event may be identified based on the name tag in the interest packet.

At 643, a determination is made as to whether a requesting entity associated with the interest packet is authorized to update the conferencing event. In this flow, a 'requesting entity' is intended to include a node and/or a user of the node seeking to make a change to participants and/or contents in a conferencing event. As described with reference to FIG. 6A, any suitable authorization techniques may be used to validate the requesting entity. If the requesting entity is not authorized to update the conferencing event, then a message may be sent at 644, indicating that the requesting entity is not authorized to update the conferencing event. In at least one embodiment, this message may be displayed on a display screen of the node that sent the interest request.

If the requesting entity is authorized to update the conferencing event, as determined at 643, then at 645, then the manifest can be updated based, at least in part, on parameters in the interest packet. For example, a source node may include parameters that indicate a new named flow to be added to the manifest when the producer wants to add new content (e.g., video, slides, etc.). In another example, a producer may want to delete a named flow when the producer is finished producing the content (e.g., video finishes, user quits speaking, etc.). In another example, a participant (producer and/or consumer) may want to leave the conferencing event. In this case, parameters of the interest packet can indicate the metadata related to the participant is to be deleted from the manifest. In a further example, the manifest may include a status of a participant that indicates whether the participant is active/live or inactive/dormant. Thus, an interest packet may include parameters indicating the activity status of the participant, which may need to be added or updated.

Once the manifest has been updated, at 646, a reply that includes the updated manifest may be sent to the node (e.g., source node 20 or client node 30) that sent the interest packet to the conference server. In at least some embodiments, if the node has previously received the manifest, only the changed portion of the manifest (i.e., the delta) is sent back to the node.

Figure 7:
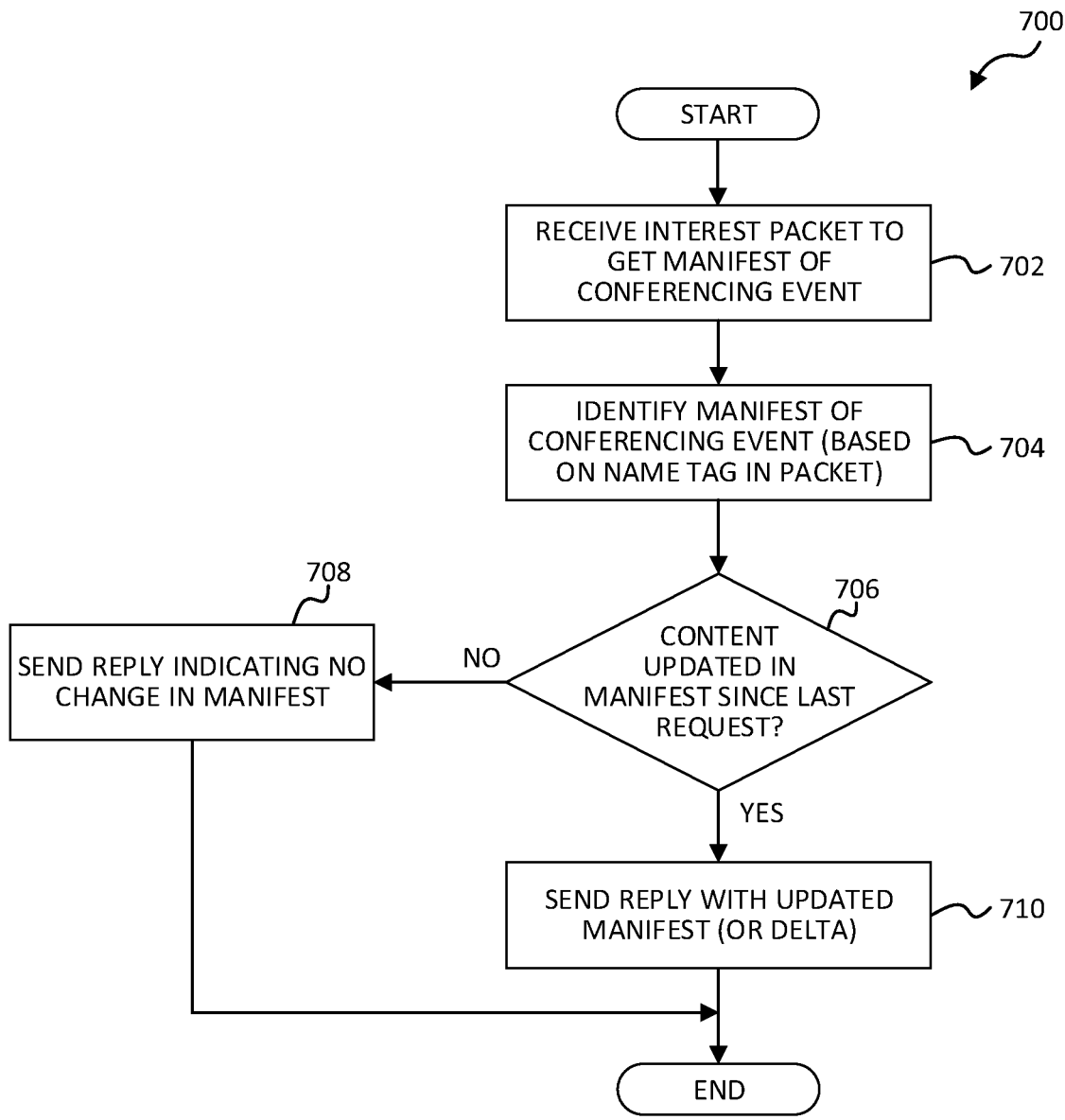
FIG. 7 is a simplified flowchart illustrating other example operations associated with multiparty real-time communications in the communication system according to at least one embodiment.

FIG. 7 shows a flowchart 700 of possible operations that may be associated with embodiments described herein. One or more sets of operations may correspond to activities of FIG. 7. In at least one embodiment, conference server 40 may comprise means such as one or more processors (e.g., processor 47), for performing the operations. In one example, at least some of the operations may be performed by conference manager 42 when executed by one or more processors such as processor 47 and may involve a manifest (e.g., manifests 44-1 through 44-M).

At 702, an interest packet is received from a node for the manifest of a conferencing event. Typically, successive requests for the manifest at given intervals are received from a client node that has subscribed to the conferencing event. At 704, the manifest for the conferencing event may be identified based on the name tag in the interest packet. At 706, a determination is made as to whether the manifest has been updated since the last request for the manifest was received from the node that sent the interest packet. In one example, this determination can be achieved using sequence numbers that indicate the level (e.g., version, timestamp, etc.) of the manifest last received by the requesting node and the level of the manifest currently stored in the conference server. If a determination is made that no updates have been made to the manifest, then at 708, a reply may be sent indicating that there has been no change in the manifest. If a determination is made that the manifest has been updated since the manifest was last requested by the node, then at 710, a reply may be sent with the updated manifest. In at least one embodiment, if the node that sent the interest packet has previously received the manifest, only the changed portion of the manifest (i.e., the delta) is included in the reply.

Figure 8:
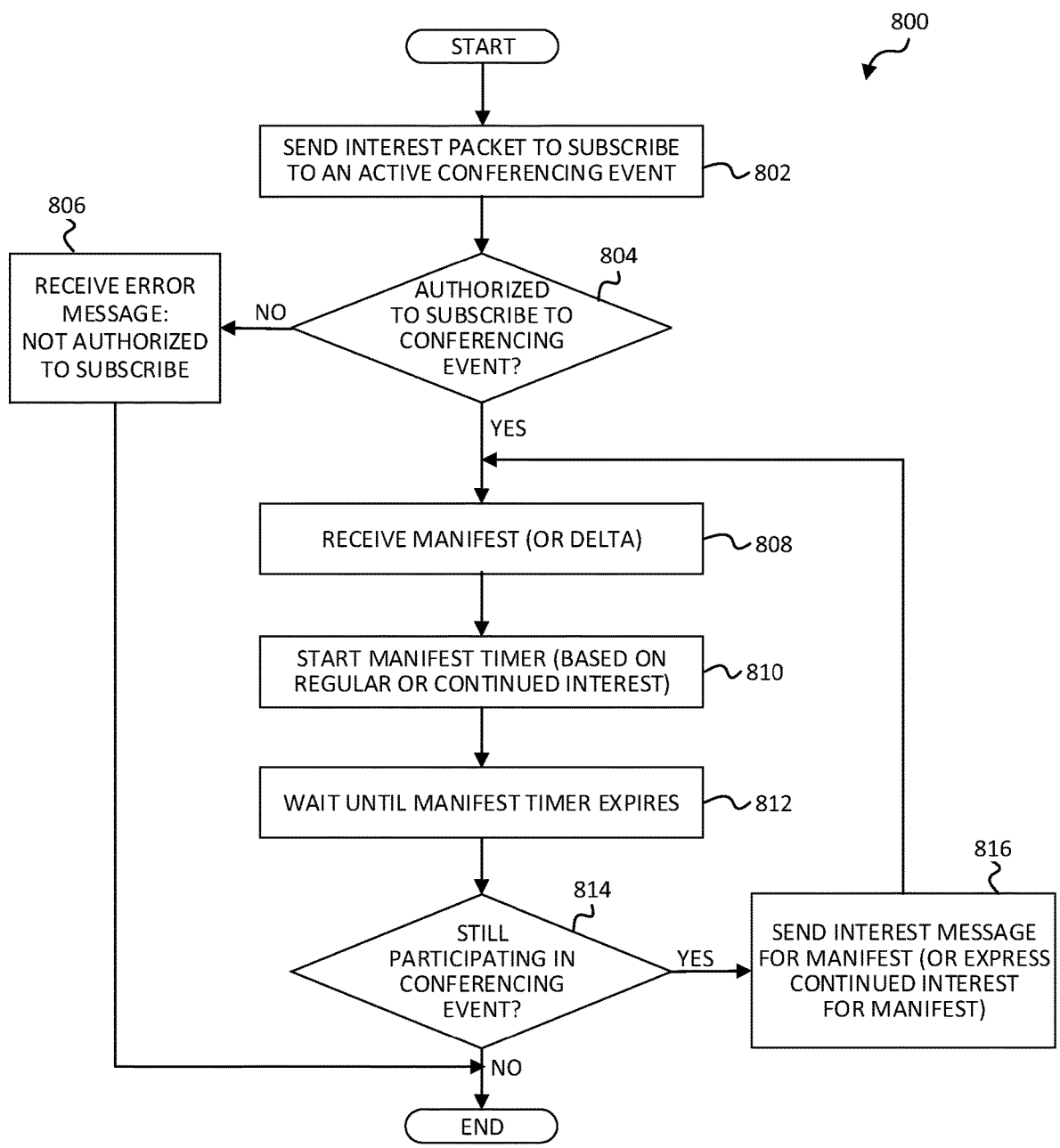
FIG. 8 is a simplified flowchart illustrating other example operations associated with multiparty real-time communications in the communication system according to at least one embodiment.

FIG. 8 shows a flowchart 800 of possible operations that may be associated with embodiments described herein. One or more sets of operations may correspond to activities of FIG. 8. In at least one embodiment, client node 30 may comprise means such as one or more processors (e.g., processor 37), for performing the operations. In one example, at least some of the operations may be performed by user agent 32 when executed by one or more processors such as processor 37 and may involve manifest timer 33.

At 802, client node 30 sends an interest packet with parameters to conference server 40 to subscribe to an active conferencing event. Client node 30 can be associated with a user (consumer) who wants to consume content produced in the conferencing event. A name tag for the conferencing event, which has been advertised in the NDN network, can be included in the interest packet. Parameters in the interest packet may include metadata related to the client node and/or user of the client node, which can be used to update the manifest to identify the client node/user as a participant (e.g., a subscriber) in the conferencing event. If the client node/user is not authorized to subscribe to the conferencing event as indicated at 804 (and as determined by conferencing server 40), then at 806, client node 30 may receive an error message indicating the user is not authorized to subscribe to the conferencing event. The error message may be displayed on a screen of client node 30 in at least one embodiment.

If the client node/user is authorized to subscribe to the conferencing event, then at 808, a manifest corresponding to the conferencing event is received by the client node. In some embodiments, if the manifest was previously received by the client node, then only the delta, which indicates changes to the manifest, may be received by the client node. A manifest timer can be used to ensure that an updated manifest is continuously requested based on predetermined intervals of time to obtain the manifest. In one embodiment, this can be achieved by setting the manifest timer to an interval of time after which an interest is to be expressed for an updated manifest. In this embodiment, a regular interest packet may be sent each time the manifest timer expires. The interval of time may be configured as any suitable amount of time based on particular needs and implementations. In one example, an interval of time to obtain the manifest may be set to 10 seconds.

In another embodiment, continuously requesting the updated manifest can be achieved by setting the manifest timer to a period of time during which the consumer is to have continued interest in the manifest, and after which a continued interest is to be expressed for an updated manifest. In this embodiment, a continued interest packet may be sent each time the manifest timer expires. The continued interest packet may be processed by an NDN router that caches the manifest or potentially just acts as a proxy to continuously request the manifest based on predetermined intervals of time to obtain the manifest. The continued interest packet may also include the period of time so that the NDN router that satisfies the continued interest packet knows how long the continued interest packet is to remain active.

At 812, processing can wait until the manifest timer expires. If periodic regular interest is expressed for the manifest, then the manifest timer will expire before another manifest (or delta) is received. If continued interest is expressed for the manifest, however, then during the period of time the manifest timer is running, client node 30 may receive multiple manifests (or deltas) or messages indicating no changes have occurred in the manifest. The number of manifests or messages depends on the particular implementation including the period of time set on the manifest timer.

At 814, a determination is made as to whether the client node/user is still participating in the conferencing event. If the client node/user is no longer participating (e.g., if the most recent manifest does not include the client node/user as a subscriber, then flow may end because the manifest no longer needs to be obtained. If the client node/user is still participating in the conferencing event, as determined at 814, then at 816, an interest (or continued interest) may be expressed for the manifest. More specifically, an interest packet or a continued interest packet may be sent toward conference server 40. Flow may then return to 808, where an updated manifest (or delta) is received and the processing loop continues. It should be noted that when the manifest has not changed since the last manifest was received, then in at least some embodiments, a message or other indication that the manifest had not changed may be received rather than the manifest or delta.

Figure 9:
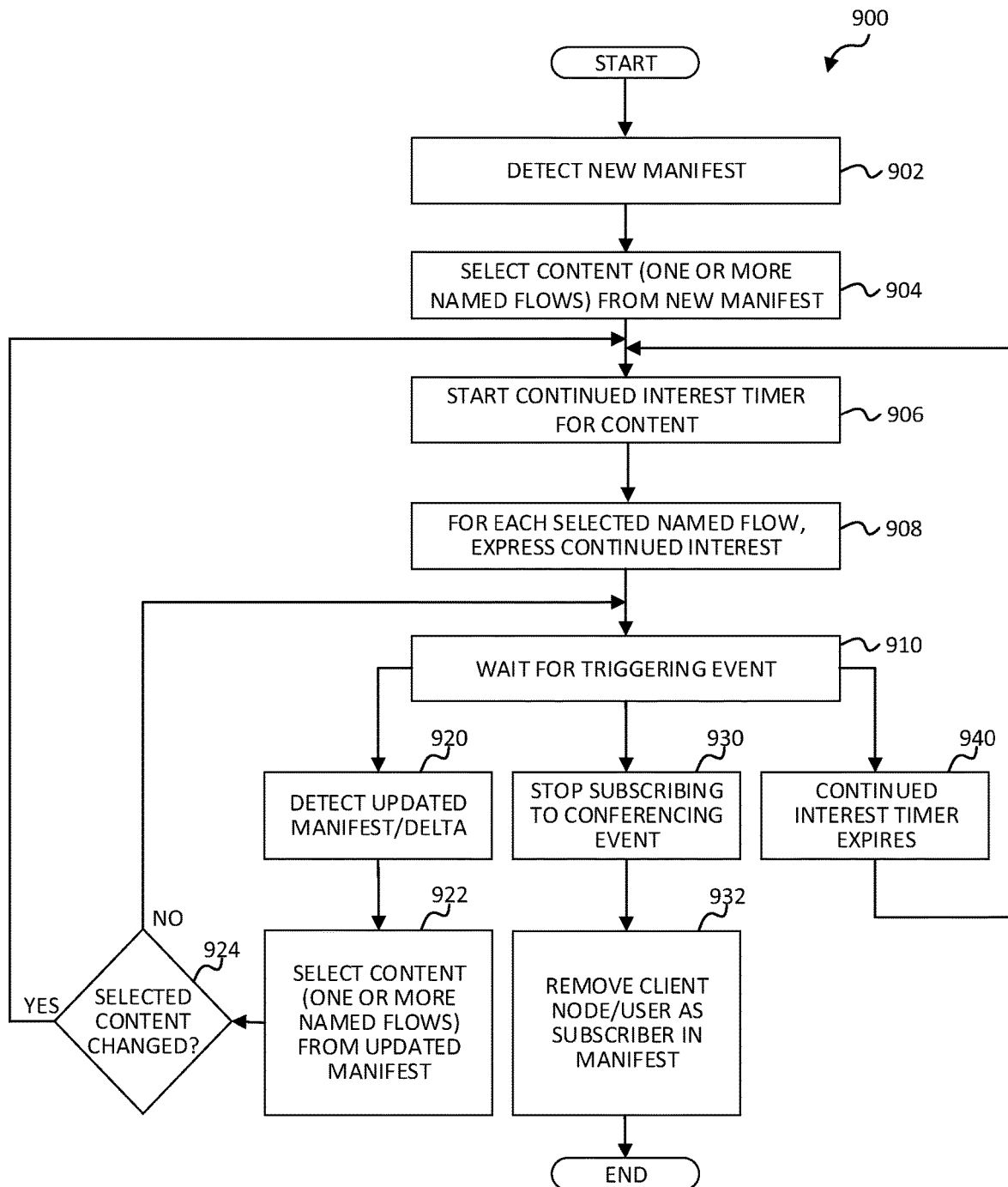
FIG. 9 is a simplified flowchart illustrating other example operations associated with multiparty real-time communications in the communication system according to at least one embodiment.

FIG. 9 shows a flowchart 900 of possible operations that may be associated with embodiments described herein. One or more sets of operations may correspond to activities of FIG. 9. In at least one embodiment, client node 30 may comprise means such as one or more processors (e.g., processor 37), for performing the operations. In one example, at least some of the operations may be performed by user agent 32 when executed by one or more processors such as processor 37, and may involve continued interest timer 35.

Operations of flowchart 900 may be initiated whenever a new manifest for a new conferencing event is received (e.g., the first instance of 808 of FIG. 8 occurring). Generally, one or more operations of flowchart 800 manage the interests expressed by client node 30 for the manifest, while one or more operations of flowchart 900 manage the interests expressed by client node 30 for the content. At 902, client node 30 detects the new manifest. At 904, one or more named flows are selected from the new manifest. In at least one embodiment, a flow can be selected from a manifest based, at least in part, on its name label in the manifest. A consumer may be allowed to select any number of named flows published by any number of source nodes for a conferencing event. In addition, a consumer may select some, but not all of the named flows from a single producer. For example, a consumer may elect to receive voice data from a particular producer, but not the video being produced by the same producer.

At 906, a continued interest timer for content can be started at client node 20. At 908, for each selected named flow (e.g., voice, video, etc.), continued interest is expressed. This can be achieved by sending a continued interest packet for each named flow toward the producer of the particular named flow. The name label of a flow can be used to route its continued interest packet toward the appropriate source. Once the continued interest has been expressed for the selected named flow, client node 30 may begin receiving content (e.g., streaming video, voice, slides, etc.). Content may continue to be received at client node 30, which will be further described with reference to FIG. 10, until a triggering event occurs as indicated at 910.

A first triggering event may occur when an updated manifest or delta is detected at 920. At 922, one or more named flows may be selected from the updated manifest, if desired. In at least some embodiments, if no change to the content being received is desired, and if the manifest indicates the previously selected content is still available, then no selection needs to be made even if the manifest has changed. However, if a change to the content being received is desired, then new selections of the named flows in the manifest may be made.

In at least one embodiment, a user of client node 30 may be given the option to select or unselect particular named flows, which are published in the manifest. In at least one embodiment, the client node may be configured so that particular (or all) content flows are automatically selected. In yet another embodiment, the client node may be configured so that content flows are automatically selected based on default settings. In addition, any combination of the aforementioned configurations is possible.

At 924, a determination is made as to whether the selected content has changed. That is, it is determined whether a different named flow or a different combination of named flows has been selected from the manifest. If a different named flow or different combination of named flows has been selected, then flow can pass to 906, where the continued interest timer for content may be started. Continued interest may be expressed for each selected named flow at 908, and selected content may be received until a triggering event occurs as indicated at 910.

A second triggering event may occur when a client node/user stops subscribing to a conferencing event at 930. At 932, the client node/user may be removed as a subscriber from the manifest. This may be achieved by sending an interest packet with parameters to conference server 40 indicating that the client node/user is to be removed from the conferencing event as a subscriber. Conference server 40 can delete from the manifest the metadata associated with the client node/user. Processing may end once the client/node user is removed from the manifest as a subscriber.

A third triggering event may occur when the continued interest timer for the content expires at 940. When the continued interest timer expires, flow may pass to 906, where the continued interest timer for content may be started. Continued interest may be expressed for each selected named flow at 908, and selected content may be received until a triggering event occurs as indicated at 910 as previously described.

The triggering events may occur in any order during a conferencing event. Generally, however, assuming that the client node/user does not stop subscribing to the conferencing event at 930, an updated manifest may be received more frequently at 920 than the expiry of the continued interest timer for the content at 940. In one example, the manifest may be received approximately every 10 seconds, while the continued interest timer may expire every few minutes (e.g., 2-3 minutes). It should be noted that in at least one embodiment, the selected content that is requested in the continued interest packet for content may be received more frequently than the manifest (or delta). In at least one embodiment, there are one or two orders of magnitude between the intervals between the recurring deliveries of content and the intervals between pulling (or recurring deliveries of) the manifest. For example, the recurring delivery of the selected content may occur every 100 milliseconds, while the manifest may be pulled (or recurring deliveries of the manifest may be made depending on the implementation) every 10 seconds.

Figure 10:
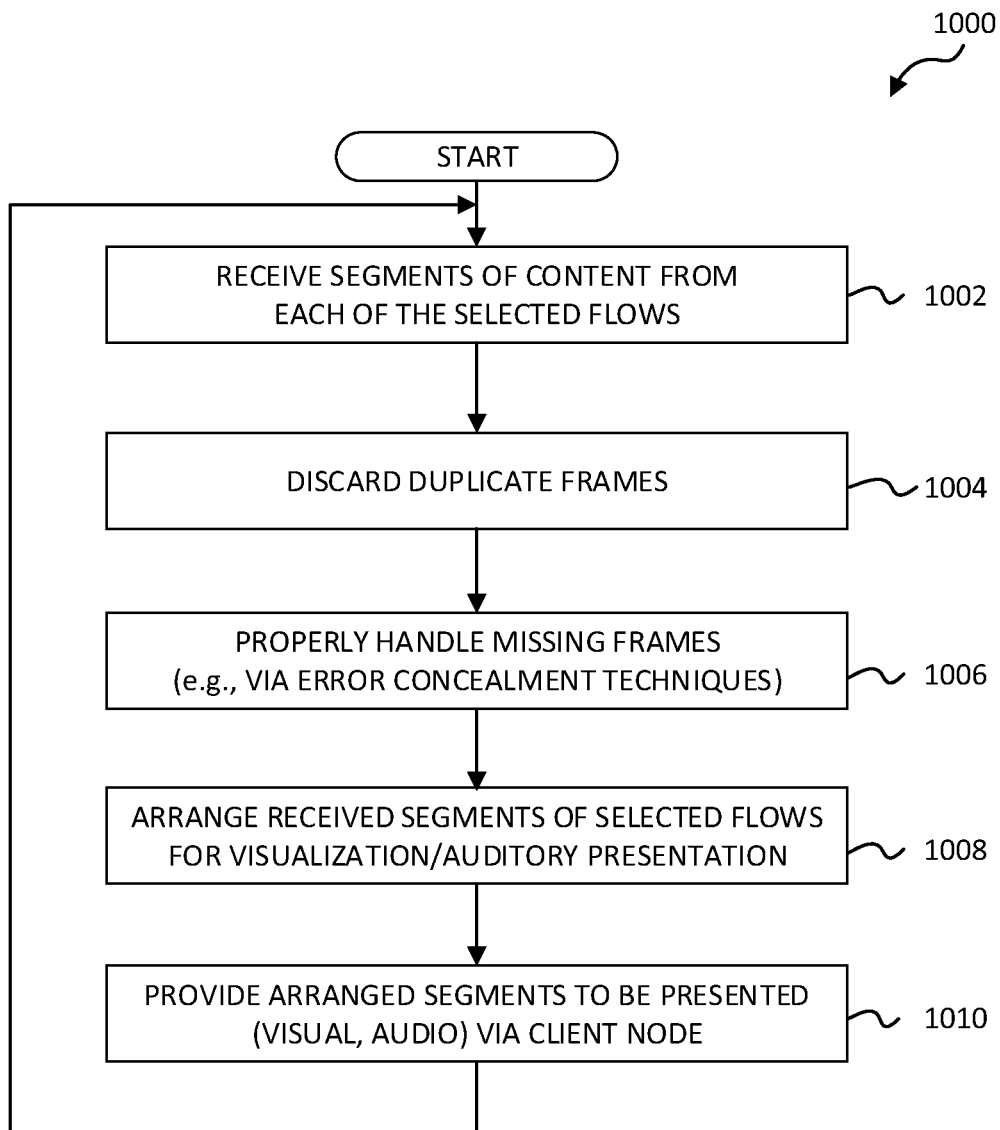
FIG. 10 is a simplified flowchart illustrating other example operations associated with multiparty real-time communications in the communication system according to at least one embodiment.

FIG. 10 shows a flowchart 1000 of possible operations that may be associated with embodiments described herein. One or more sets of operations may correspond to activities of FIG. 10. In at least one embodiment, client node 30 may comprise means such as one or more processors (e.g., processor 37), for performing the operations. In one example, at least some of the operations may be performed by user agent 32 when executed by one or more processors such as processor 37.

Operations of flowchart 1000 may be initiated when client node 30 begins receiving content after continued interest for content is expressed at 908 in FIG. 9. In at least one embodiment, processing shown in flowchart 1000 may continue as long as content is being received at client node 30. At 1002, client node 30 receives segments (e.g., one or more frames of content) from each of the selected named flows for which continued interest has been expressed. In at least one embodiment, duplicate frames may be received in each recurring delivery of content to ensure resiliency. For example, the continued interest packet may request recurring delivery of the latest 200 ms of content every 100 ms. In this example scenario, 100 ms of content may be duplicated in each segment received by client node 30. At 1004, duplicate frames may be discarded.

At 1006, the segments may be evaluated to determine whether there are any missing frames in the content. If any frames are missing, this scenario may be handled using any suitable error concealment techniques. At 1008, the received segments of the selected named flows may be arranged for visualization and auditory presentation. At 1010, the arranged segments may be provided for presentation via client node 30 (e.g., via a display, headphones, speakers, etc.). Flow may return to 1002 and repeat the processing activities whenever more segments of content have been received.

Figure 11:
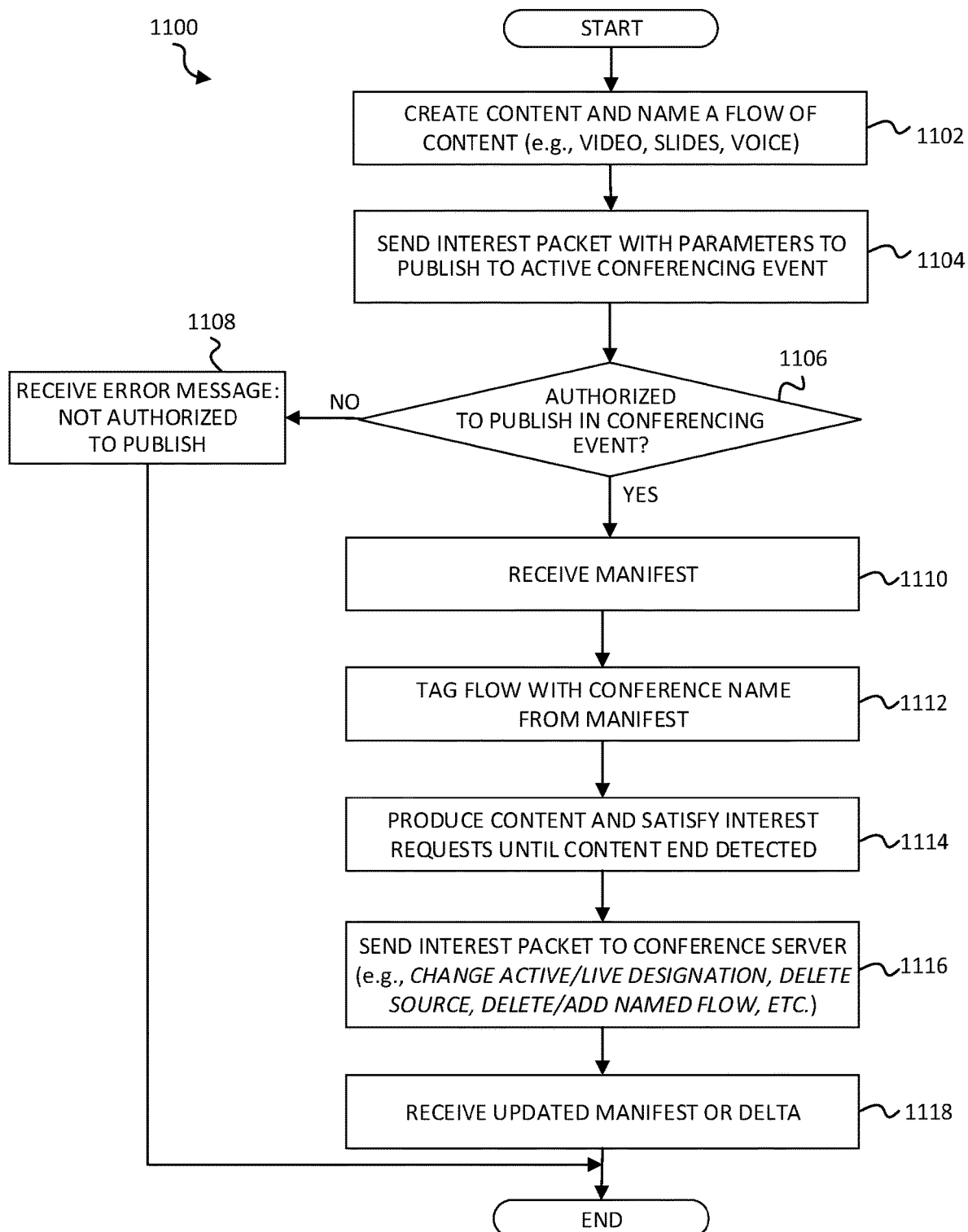
FIG. 11 is a simplified flowchart illustrating other example operations associated with multiparty real-time communications in the communication system according to at least one embodiment.

FIG. 11 shows a flowchart 1100 of possible operations that may be associated with embodiments described herein. One or more sets of operations may correspond to activities of FIG. 11. In at least one embodiment, source node 20 may comprise means such as one or more processors (e.g., processor 27), for performing the operations. In one example, at least some of the operations may be performed by source agent 22 when executed by one or more processors such as processor 27 and may involve source files 24.

Operations of flowchart 1100 may be initiated by a source node 20 whenever a manifest for a conferencing event is activated and the conference name tag is advertised in the NDN network (e.g., at 508 of FIG. 5). At 1002, the source node 20 can begin creating content and can name a flow of the content. The content, such a stream of voice, video, or slides for example, may be produced by the user of source node 20. In one example, the user could produce a voice stream by speaking into a microphone of source node 20, or could produce a video recording by using a video recorder coupled to the source node. Source node 20 can generate and name flows of the content at 1102. Each type of content can have its own flow and name label. For example, a flow for the video stream is separate from a flow for the voice stream and the name for the video flow is different from the name for the voice flow.

At 1104, source node 20 sends an interest packet with parameters to conference server 40 to publish the flow (or flows) to an active conferencing event. Source node 20 can be associated with a user (producer) who is producing the content for the conferencing event. A name tag for the conferencing event, which has been advertised in the NDN network, can be included in the interest packet. Parameters in the interest packet may include metadata related to the source node and/or user of the source node, which can be used to update the manifest to identify the client node and/or user as a participant (e.g., a publisher) in the conferencing event. In addition, the parameters can also identify the named flow or flows to be published in the manifest.

If the source node/user is not authorized to publish in the conferencing event as indicated at 1106 (and as determined by conference server 40), then at 1108, source node 20 may receive an error message indicating the user is not authorized to publish. The error message may be displayed on a screen of source node 20 in at least one embodiment. If the source node/user is allowed to publish in the conferencing event, then at 1110, source node 20 can receive the updated manifest that corresponds to the conferencing event. The manifest can identify the source node and/or user as a participant in the conferencing event and can also identify the flow or flows that are being produced at the source node (and at any other source nodes) for the conferencing event. The manifest can also identify any client nodes and/or users that have subscribed to the conferencing event.

At 1112, the flow may be tagged with the conference name associated with the conferencing event to which the flow is to be injected. The conference name may be obtained from the manifest. At 1114, content for the one or more flows may be produced at source node 20 and stored in source files 24 or some other repository such as cache in the source node. When repeated interest requests for the content is received, the interest request may be satisfied by source node 20 until the content end is detected. The requested content may be obtained from the source files in at least one example.

After the content for the named flow or flows is no longer being produced, at 1116, an interest update packet with parameters may be sent to conference server 40 in order to update the manifest. For example, the parameters may indicate that one or more named flows are to be removed from or added to the manifest. In another example, the parameters may indicate a status of the user as changing to dormant/inactive. In another example, the parameters may indicate the source node/user is to be removed from the manifest. At 1118, an updated manifest or delta may be received based, at least in part, on the changes made in response to the interest update packet. Operations of flowchart 1100 may be repeated whenever new content is produced for a conferencing event.

Figure 12:
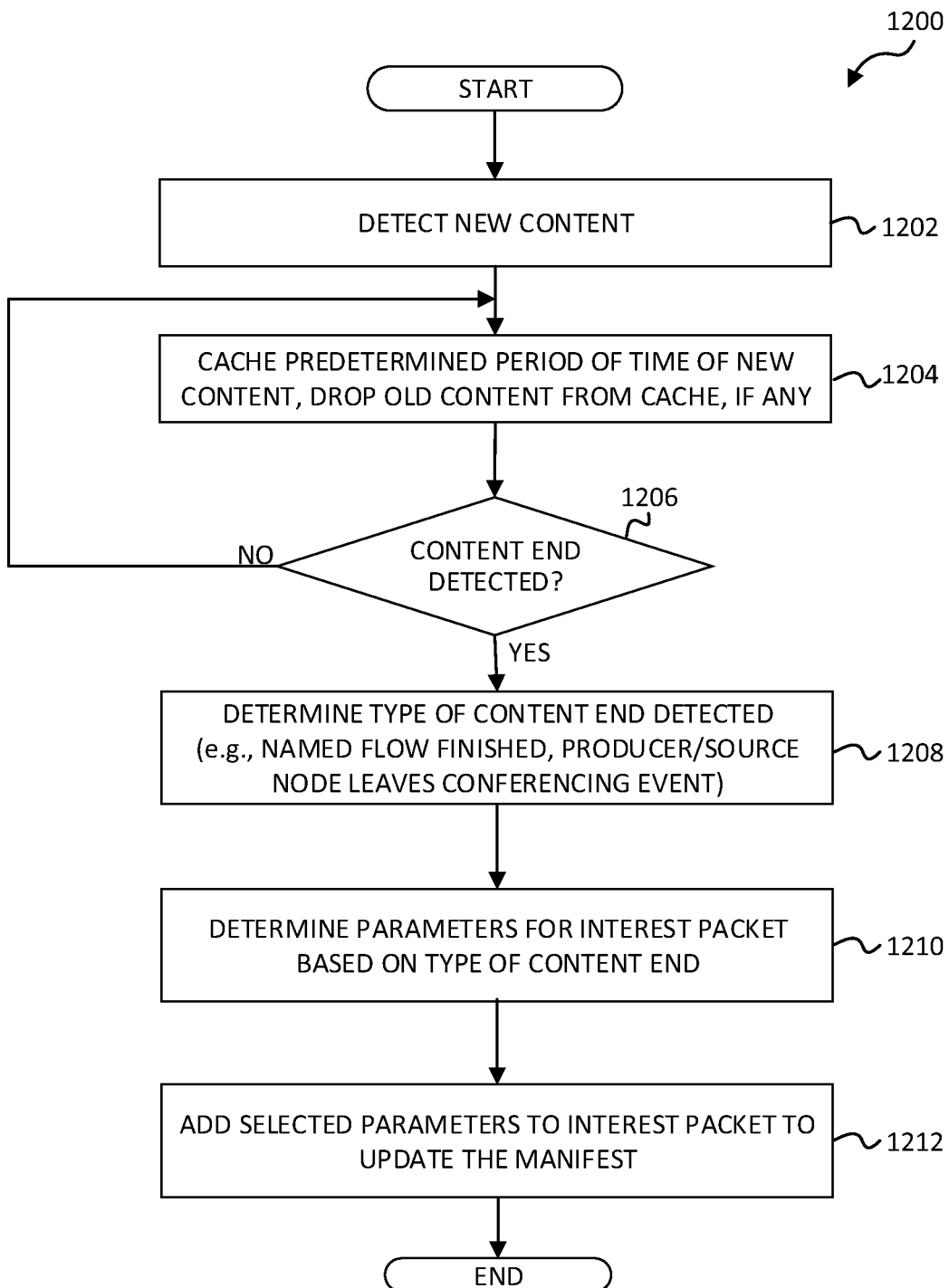
FIG. 12 is a simplified flowchart illustrating other example operations associated with multiparty real-time communications in the communication system according to at least one embodiment.

FIG. 12 shows a flowchart 1200 of possible operations that may be associated with embodiments described herein. One or more sets of operations may correspond to activities of FIG. 12. In at least one embodiment, source node 20 may comprise means such as one or more processors (e.g., processor 27), for performing the operations. In one example, at least some of the operations may be performed by source agent 22 when executed by one or more processors such as processor 27, and may involve source files 24.

In at least one embodiment, operations of flowchart 1200 represent details of operations that may be performed when source node 20 produces content until the content end is detected (e.g., at 1114 of FIG. 11). At 1202, new content being produced at source node 20 is detected. At 1204, a predetermined period of time of the new content can be cached, for example, in source files 24. For example, when a user is producing a stream of content (e.g., voice, video), new content may be continuously produced. The stream of data being produced may be stored in periods of time. Thus, when new content is detected, after a predetermined period of time, the content can be cached in source node 20. The storage files may store a certain amount of data and old content can be deleted before the new data is stored. In at least one embodiment, the storage files are configured to store enough data to enable source node 20 to recreate the last iframe of the content.

At 1206, a determination is made as to whether an end of the content is detected. If not, then flow can return to 1204, to cache data for the next consecutive period of time. If the end of the content is detected (e.g., video is turned off, speaking has stopped for a threshold amount of time indicating the end, etc.), then at 1208, a determination can be made as to what type of content end was detected. For example, a content end could be detected when a user stops producing a named flow (e.g., stops talking for a threshold period of time), but continues to subscribe to the conferencing event. In another example, a content end could be detected when a user who is producing the content leaves the conferencing event. This determination is enables selection of appropriate parameters for an interest packet to update the manifest at 1210. At 1212, the selected parameters can be added to the interest packet to enable appropriate updates to the manifest. In at least one embodiment, flow returns to 1116 of FIG. 11 where the interest packet is sent to conference server 40 to update the manifest.

Figure 13:
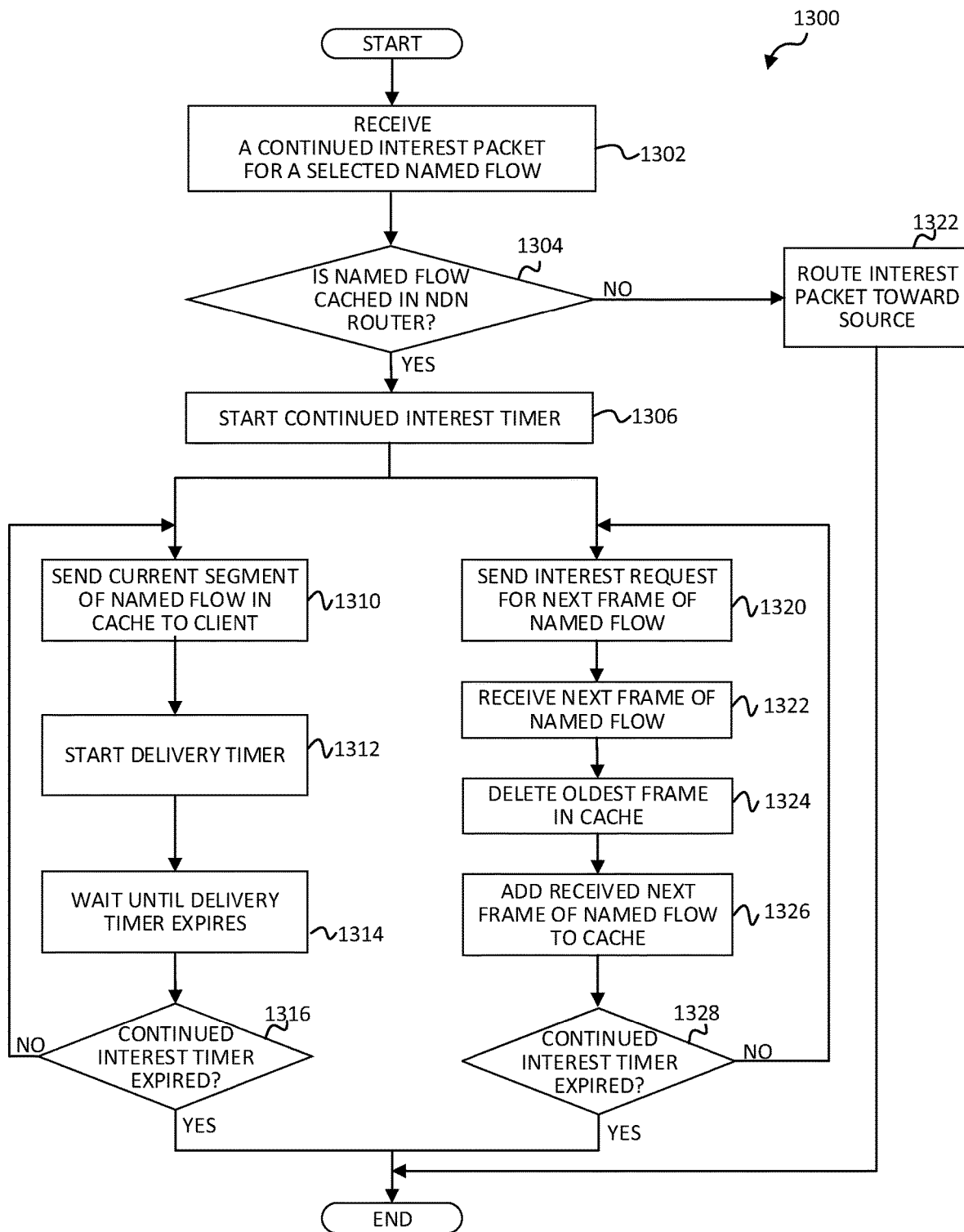
FIG. 13 is a simplified flowchart illustrating other example operations associated with multiparty real-time communications in the communication system according to at least one embodiment.

FIG. 13 shows a flowchart 1300 of possible operations that may be associated with embodiments described herein. One or more sets of operations may correspond to activities of FIG. 13. In at least one embodiment, NDN router 50 may comprise means such as one or more processors (e.g., processor 57), for performing the operations. In one example, at least some of the operations may be performed by interest proxy module 51 when interest proxy module 51 is executed by one or more processors such as processor 57. Operations in flowchart 1300 may also involve continued interest timer 53A, delivery timer 53B, and/or content cache 52.

Operations of flowchart 1300 may be initiated when an NDN router receives a continued interest packet for a named flow. At 1302, a continued interest packet for a selected named flow is received by an NDN router. At 1304, a determination is made as to whether the named flow is cached in the NDN router. If the named flow is not cached in the NDN router, then at 1322, the continued interest packet is routed toward the source node where the named flow is being produced.

If the named flow is cached in the NDN router, then at 1306, a continued interest timer may be started. In at least one embodiment, the continued interest timer can be set to run for a period of time that lasts as long as the NDN router is to provide recurring deliveries of the named flow to the client node without requiring another interest packet from the client node. For ease of reference, this period of time is also referred to herein as 'continued interest time period for content'. This continued interest time period for content may be included in the continued interest packet received by the NDN router.

In at least one embodiment, two processes may run simultaneously on an NDN router. One process involves providing recurring deliveries of content to the client node. A potential embodiment of this process is generally illustrated by operations 1310 through 1316. The other process involves sending recurring interest requests to the source node to pull the named flow. A potential embodiment of this other process is generally illustrated by operations 1320 through 1328.

With reference to the recurring delivery process, at 1310, NDN router 50 can send a current segment of the selected named flow, which may be stored in the cache, to client node 30. For streaming content, the current segment is the most recent segment of streaming content received from the source node. In at least one embodiment, the continued interest packet may indicate a duration of a segment to be delivered to the client node at each recurring delivery. For example, N*T may define the duration of a segment, where N equals the number of periods that are cached in the NDN router and T equals a length of a period.

At 1312, a delivery timer may be started. In at least one embodiment, the delivery timer can be set to run for an interval of time that is to be maintained between deliveries of segments to the client node. For ease of reference, this interval is referred to herein as 'recurring delivery interval'. In at least one embodiment, the continued interest packet may include the recurring delivery interval to be used by the NDN router. Also, in at least one embodiment, the span of the continued interest time period for content may be at least as long as a number of consecutive recurring delivery intervals.

At 1314, the processing may wait until expiry of the delivery timer. After the delivery timer expires, a determination may be made at 1316, as to whether the continued interest timer has also expired. If both timers have expired, then the recurring delivery process of flowchart 1300 can end. Although not shown, it will be apparent that in at least some embodiments, a last delivery may be made by sending the current segment from the cache to the client node. At 1316, if the continued interest timer is determined not to have expired, then the recurring delivery process can be repeated. Flow can pass to 1310 where the current segment from the cache is sent to the client node and processing continues as previously described.

At any point in time, content cache contains a current segment of the content of the named flow. In at least one embodiment, each current segment that is sent at 1310, was updated by new contents that were produced during the last delivery time interval. This updating can be performed by the recurring interest request process of 1320 through 1328.

In one example scenario, the continued interest time period for content could be a few minutes (e.g., 2 minutes, 3 minutes, 4 minutes, etc.). The recurring delivery interval could be 100 milliseconds, and the duration of the segment of the named flow to deliver could be 200 milliseconds. In this example, two periods of the named flow (i.e., 100 milliseconds each) may be stored in cache and delivered successively at the given time intervals (e.g., each time the delivery timer expires). For these example values, if the continued interest time period is set to 2 minutes, then 1200 recurring deliveries of the named flow may be made from the NDN router to the client node without requiring another interest packet.

With reference to the recurring interest request process, at 1320, the NDN router sends an interest request to the source node for the next frame of the selected named flow. At 1322, the NDN router receives the next frame of the selected named flow. At 1324, the oldest frame in the cache can be deleted. At 1326, the newly received next frame may be added to the cache.

A determination may be made at 1328, as to whether the continued interest timer has expired. If the continued interest timer has expired, then the recurring interest request process of flowchart 1300 can end. However, if the continued interest timer is determined not to have expired, then the recurring interest request process can be repeated. Flow can pass to 1320 where a new interest packet is sent to the source node to pull the next frame of the selected named flow and processing can continue as previously described.

It should be noted that even if the continued interest timer expires, the NDN router might continue to pull and cache the named flow from the source node. For example, other client nodes may also be expressing interest in the named flow and their continued interest may not be expired. Additionally, the client node can be suitably configured to send a new continued interest packet for the named flow to ensure that the named flow is continuously streamed to the client node without breaks.

Interest packets may be sent to the source node during the continued interest period with a frequency that enables the NDN router to continuously receive the selected named flow. In one embodiment, this may be achieved by setting a content timer that triggers sending an interest packet to the source node upon its expiry. In other embodiments, a new interest packet may be sent after each frame is received.

Figure 14:
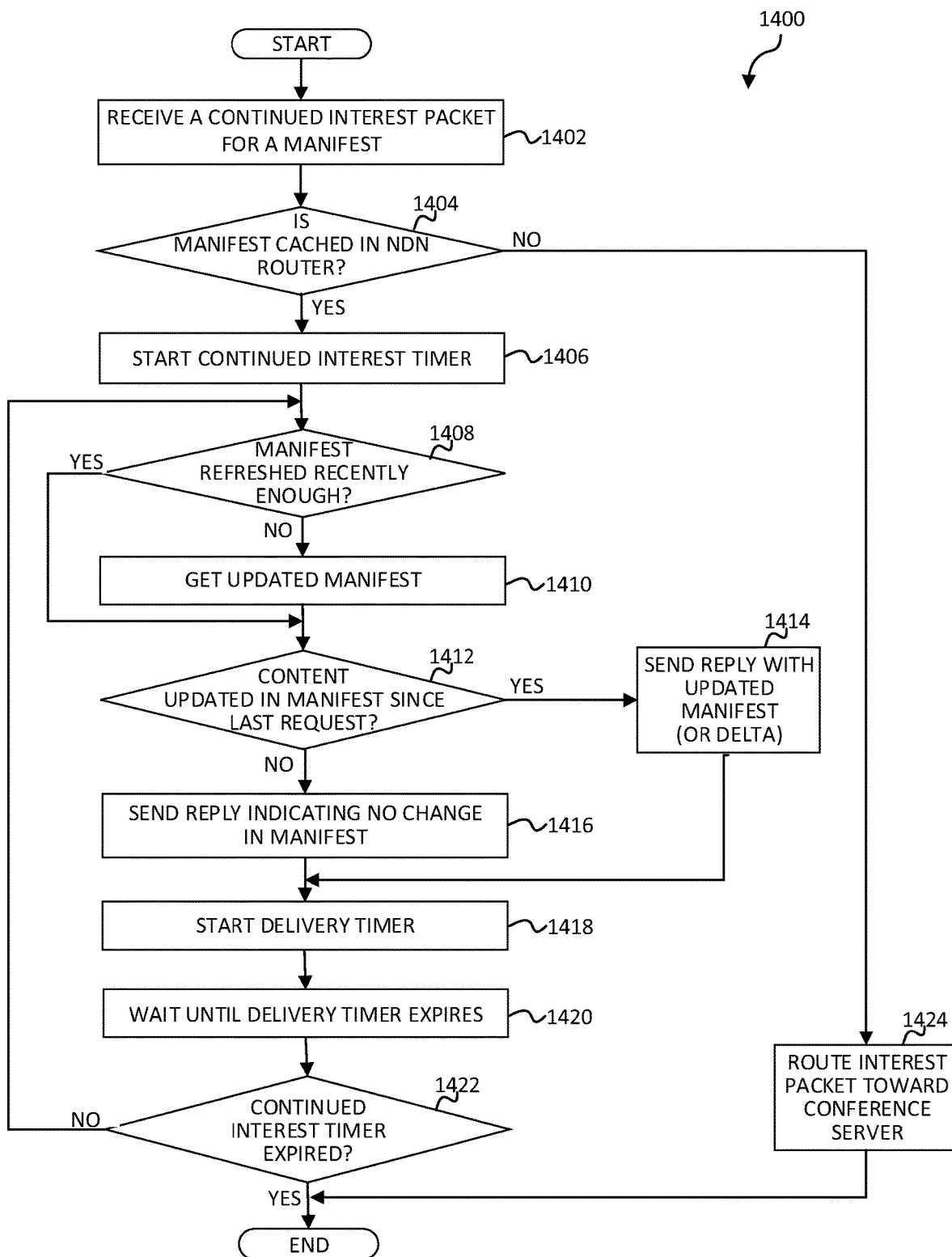
FIG. 14 is a simplified flowchart illustrating other example operations associated with multiparty real-time communications in the communication system according to at least one embodiment.

FIG. 14 shows a flowchart 1400 of possible operations that may be associated with embodiments described herein. One or more sets of operations may correspond to activities of FIG. 14. In at least one embodiment, NDN router 50 may comprise means such as one or more processors (e.g., processor 57), for performing the operations. In one example, at least some of the operations may be performed by interest proxy module 51 when interest proxy module 51 is executed by one or more processors such as processor 57. Operations in flowchart 1400 may also involve continued interest timer 53A, delivery timer 53B, and/or content cache 52.

Operations of flowchart 1400 may be initiated when an NDN router receives a continued interest packet for a manifest. At 1402, a continued interest packet for a manifest is received by an NDN router. At 1404, a determination is made as to whether the manifest is cached in the NDN router. If the manifest is not cached in the NDN router, then at 1424, the continued interest packet is routed toward the conference server where the manifest is maintained.

If the manifest is cached in the NDN router, then at 1406, a continued interest timer may be started. In at least one embodiment, the continued interest timer can be set to run for a period of time that lasts as long as the NDN router is to provide recurring deliveries of the manifest (or a delta of the manifest or a message indicating no changes have occurred in the manifest) to the client node without requiring another interest packet from the client node. For ease of reference, this period of time is also referred to herein as 'continued interest time period for the manifest'. This continued interest time period for the manifest may be included in the continued interest packet received by the NDN router at 1402.

At 1408, a determination is made as to whether the manifest that is cached in the router is fresh enough. In one example, the cached manifest may be fresh enough if the cached manifest was received within a delivery time interval associated with the continued interest packet received at 1402. In another embodiment, the manifest that is cached in the router is fresh enough if it was received by the router within some other time period that is not greater than the delivery time interval.

If the manifest is determined to be not fresh enough, then at 1410, a new manifest may be requested from the conference server. After a more recent manifest is obtained, or if the manifest is determined to be fresh enough at 1408, then at 1412, a determination is made as to whether the manifest has been updated since the last request for the manifest was received from the client node. In one example, this determination can be achieved using sequence numbers that indicate the level (e.g., version, timestamp, etc.) of the manifest last received by the client node and the level of the manifest cached in the NDN router. If a determination is made that no updates have been made to the manifest, then at 1416, a reply may be sent indicating that there has been no change in the manifest. If a determination is made that the manifest has been updated since the last request for the manifest was received from the client node, then at 1414, a reply may be sent with the updated manifest. In at least one embodiment, if the client node has previously received the manifest, only the changed portion of the manifest (i.e., the delta) is included in the reply.

At 1418, a delivery timer can be started. In at least one embodiment, the delivery timer can be set to run for an interval of time that is to be maintained between deliveries of the manifest to the client node. In at least one embodiment, the continued interest packet may include the recurring delivery interval to be used by the NDN router for determining how often to send the manifest to the client node. Also, in at least one embodiment, the span of the continued interest time period for the manifest may be at least as long as a number of consecutive recurring delivery intervals for the manifest.

At 1420, the processing may wait until expiry of the delivery timer. After the delivery timer expires, a determination may be made at 1422, as to whether the continued interest timer has also expired. If both timers have expired, then the processing can end and the continued interest packet is no longer active. Although not shown, it will be apparent that in at least some embodiments, a last delivery of the manifest may be made by sending the current manifest from the cache to the client node. At 1422, if the continued interest timer is determined not to have expired, then the process can be repeated. Flow can pass to 1408, where the freshness of the current cached manifest is determined and processing may continue as previously described.

It should be noted that the operations illustrated in FIG. 14 with respect to continued interest for a manifest have been described with reference to certain elements of NDN router 50. These elements of NDN router 50 were also referenced in the description of processing of FIG. 13 with respect to continued interest for content. It will be apparent, however, that NDN router 50 could potentially include separate elements to perform the processing of continued interest packets for named flows and of continued interest packets for manifests.

Variations and Implementations

In certain example implementations, communication system 100 may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements (e.g., memory elements 29, 39, 49, 59) being able to store software, logic, code, and/or processor instructions that are executed to carry out the activities described herein. A processor can execute any type of instructions associated with the data to achieve the operations detailed herein. In one example, a processor in communication system 100 (e.g., processors 27, 37, 47, 57) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the live multiparty conferencing capabilities of an ICN network, as outlined herein. Additionally, these network elements may include at least one processor that can execute software, an algorithm, or other instructions to perform the improved live conferencing capabilities, as disclosed herein. These network elements may further keep information, to be used in achieving the live multiparty conferencing capabilities as discussed herein, in any suitable memory element (ternary content-addressable memory (TCAM), random access memory (RAM), read only memory (ROM), EPROM, EEPROM, ASIC, etc.), software, hardware, or in any other suitable component, device, element, or object where appropriate and based on particular needs. Any of the memory items discussed herein (e.g., caches, short-lived caches, repositories, stores, databases, tables, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, sending, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements.

It should be appreciated that the systems described herein are readily scalable and can accommodate a large number of components, as well as more complicated/sophisticated arrangements and configurations. Accordingly, the examples provided should not limit the scope or inhibit the broad teachings of the live conferencing capabilities of communication system 100 as potentially applied to a myriad of other architectures or implementations.

It is also important to note that the activities, interactions, and operations shown and described herein illustrate only some of the possible scenarios and patterns that may be executed by, or within, communication system 100. Some of these activities, interactions, and/or operations may be deleted, moved, or removed where appropriate, or may be modified or changed considerably without departing from the scope of the present disclosure. In addition, a number of these activities, interactions, and/or operations have been described as being executed in a particular order or concurrently with, or in parallel to, one or more additional activities, interactions, and/or operations. However, the timing of these activities, interactions, and/or operations may be altered considerably.

The preceding operational flows have been offered for purposes of example and discussion. Substantial flexibility is provided by the live conferencing capabilities of communication system 100 in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

As used herein, unless expressly stated to the contrary, use of the phrase 'at least one of' preceding multiple items (e.g., elements, conditions, activities, etc.) is intended to mean any combination of the named items. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular items (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure.

Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of the live conferencing system for an NDN network as disclosed herein.

What is claimed is:

1. A method comprising:
receiving a continued interest packet indicating a first time period for which a client node requests recurring deliveries of a named flow being produced at a source node;

sending to the client node a plurality of segments of the named flow, wherein the segments are sent successively at given time intervals during the first time period; and sending to the source node a plurality of interest packets during the first time period to request consecutive portions of the named flow.

2. The method of claim 1, wherein a name label of the named flow is published in a manifest associated with a conferencing event in a network.

3. The method of claim 2, wherein the continued interest packet includes the name label associated with the named flow and a name tag associated with the conferencing event.

4. The method of claim 1, wherein each segment of the plurality of segments is longer than one of the time intervals by a factor of N, wherein N is greater than one.

5. The method of claim 1, wherein, for each of a pair of first and second segments sent successively to the client node, a portion of the first segment is included in the second segment.

6. The method of claim 1, wherein the continued interest packet is received in a network element of a network, the network including a Named Data Networking (NDN) architecture.

7. The method of claim 1, wherein the segments of the named flow are pulled successively from a cache at the given time intervals.

8. The method of claim 7, further comprising:

responsive to receiving a consecutive portion of the named flow from the source node, deleting from the cache an oldest portion of the named flow stored in the cache, wherein the oldest portion corresponds in duration to the received consecutive portion; and storing the received consecutive portion in the cache.

9. The method of claim 1, wherein each consecutive portion of the named flow is a frame of the named flow, wherein each segment of the named flow includes a set of frames of the named flow.

10. The method of claim 1, wherein the named flow includes one of video content, voice content, or slides content.

11. At least one non-transitory machine-readable storage medium including instructions that, when executed, causes at least one processor to perform operations comprising:

receiving a continued interest packet indicating a first time period for which a client node requests recurring deliveries of a named flow being produced at a source node;

sending to the client node a plurality of segments of the named flow, wherein the segments are sent successively at given time intervals during the first time period; and sending to the source node a plurality of interest packets during the first time period to request consecutive portions of the named flow.

12. The at least one non-transitory machine-readable storage medium of claim 11, wherein a name label of the named flow is published in a manifest associated with a conferencing event in a network.

13. The at least one non-transitory machine-readable storage medium of claim 12, wherein the continued interest packet includes the name label associated with the named flow and a name tag associated with the conferencing event.

14. The at least one non-transitory machine-readable storage medium of claim 11, wherein the segments of the named flow are pulled successively from a cache at the given time intervals.

15. The at least one non-transitory machine-readable storage medium of claim 14, wherein the instructions, when executed, causes the at least one processor to perform further operations comprising:

responsive to receiving a consecutive portion of the named flow from the source node, deleting from the cache an oldest portion of the named flow stored in the cache, wherein the oldest portion corresponds in duration to the received consecutive portion; and storing the received consecutive portion in the cache.

16. An apparatus comprising:

at least one memory configured to store instructions; and at least one processor for executing the instructions, wherein executing the instructions causes the apparatus to perform operations, comprising:

receiving a continued interest packet indicating a first time period for which a client node requests recurring deliveries of a named flow being produced at a source node;

sending to the client node a plurality of segments of the named flow, wherein the segments are sent successively at given time intervals during the first time period; and sending to the source node a plurality of interest packets during the first time period to request consecutive portions of the named flow.

17. The apparatus of claim 16, wherein a name label of the named flow is published in a manifest associated with a conferencing event in a network.

18. The apparatus of claim 17, wherein the continued interest packet includes the name label associated with the named flow and a name tag associated with the conferencing event.

19. The apparatus of claim 17, wherein the segments of the named flow are pulled successively from a cache at the given time intervals.

20. The apparatus of claim 19, wherein executing the instructions causes the apparatus to perform further operations, comprising:

responsive to receiving a consecutive portion of the named flow from the source node, deleting from the cache an oldest portion of the named flow stored in the cache, wherein the oldest portion corresponds in duration to the received consecutive portion; and storing the received consecutive portion in the cache.

* * * * *